US008689115B2

(12) United States Patent  
Vonog et al.

(10) Patent No.: US 8,689,115 B2
(45) Date of Patent: Apr. 1, 2014

(54) METHOD AND SYSTEM FOR DISTRIBUTED COMPUTING INTERFACE

(75) Inventors: Stanislav Vonog, San Francisco, CA (US); Nikolay Surin, Dolgoprudnyi (RU); Gilman Louie, San Francisco, CA (US); Vladimir Kuznetsov, Menlo Park, CA (US)

(73) Assignee: Net Power and Light, Inc., San Francisco, CA (US)

( * ) Notice: Subject to any disclaimer, the term of this patent is extended or adjusted under 35 U.S.C. 154(b) by 371 days.

(21) Appl. No.: 12/564,010

(22) Filed: Sep. 21, 2009

(65) Prior Publication Data

US 2010/0122184 A1    May 13, 2010

Related U.S. Application Data

(60) Provisional application No. 61/098,682, filed on Sep. 19, 2008.

(51) Int. Cl.
  *G06F 3/00* (2006.01)
  *G06F 15/16* (2006.01)

(52) U.S. Cl.
  USPC ............ 715/751; 715/756; 715/759; 709/204

(58) Field of Classification Search
  USPC .................................. 715/751, 753, 756, 759
  See application file for complete search history.

(56) References Cited

U.S. PATENT DOCUMENTS

| | | | | |
|---|---|---|---|---|
| 5,793,365 A | * | 8/1998 | Tang et al. | 715/758 |
| 6,191,807 B1 | * | 2/2001 | Hamada et al. | 348/14.07 |
| 6,343,313 B1 | * | 1/2002 | Salesky et al. | 709/204 |
| 7,676,542 B2 | * | 3/2010 | Moser et al. | 709/204 |
| 7,681,136 B2 | * | 3/2010 | Gennaro et al. | 715/751 |
| 7,853,886 B2 | * | 12/2010 | Drucker et al. | 715/759 |
| 8,190,707 B2 | * | 5/2012 | Trivedi et al. | 709/218 |
| 8,291,079 B1 | * | 10/2012 | Colton et al. | 709/226 |
| 2003/0018834 A1 | * | 1/2003 | Eilers et al. | 710/1 |
| 2003/0097410 A1 | * | 5/2003 | Atkins et al. | 709/206 |
| 2006/0053380 A1 | * | 3/2006 | Spataro et al. | 715/753 |
| 2006/0136828 A1 | * | 6/2006 | Asano | 715/733 |
| 2007/0005707 A1 | * | 1/2007 | Teodosiu et al. | 709/206 |
| 2009/0119604 A1 | * | 5/2009 | Simard et al. | 715/757 |
| 2010/0050173 A1 | * | 2/2010 | Hensbergen | 718/1 |

OTHER PUBLICATIONS

Co-Pending U.S. Appl. No. 13/316,845 of Vonog, S., et al., filed Dec. 12, 2011.
Co-pending U.S. Appl. No. 13/270,126 of Lemmey, T., et al., filed Oct. 10, 2011.
Co-Pending U.S. Appl. No. 13/316,868 of Surin, N., et al., filed Dec. 12, 2011.
Co-pending U.S. Appl. No. 61/632,400 of Lemmey, T., et al., filed Oct. 7, 2011.
Co-pending U.S. Appl. No. 61/098,682 of Vonog, et al., filed Sep. 19, 2008.

* cited by examiner

*Primary Examiner* — Kieu Vu
*Assistant Examiner* — Blaine Basom
(74) *Attorney, Agent, or Firm* — Perkins Coie LLP

(57) ABSTRACT

A method and system for distributed computing interface are disclosed. According to one embodiment, a computer implemented method comprises accessing a collaborative interface, wherein the collaborative interface comprises persistent shared space, wherein visual representation of the collaborative interface is identical for each client accessing the collaborative interface. In a single action, an object is dragged into the collaborative interface and the object is displayed in real time in the collaborative interface. The object is accessible to other clients in the collaborative interface and the state of the object is continuously synchronized. The object is manipulated in the collaborative interface and other clients accessing the collaborative interface are viewed.

27 Claims, 22 Drawing Sheets

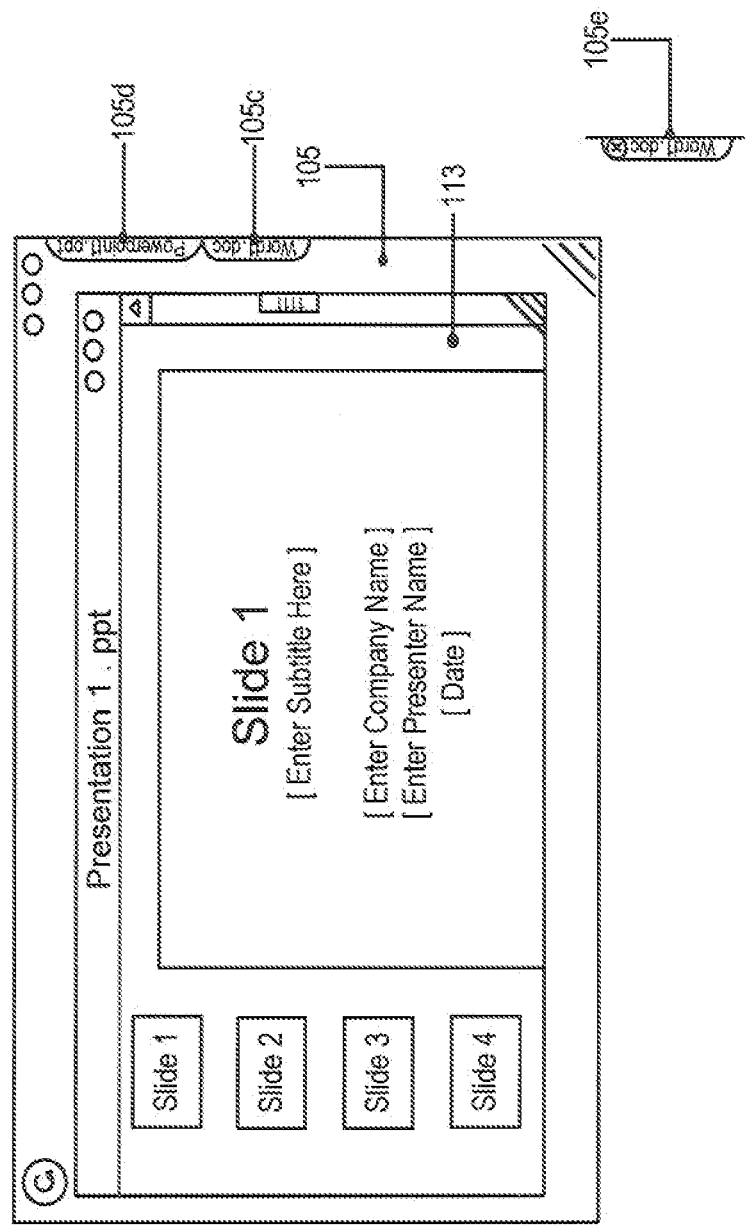
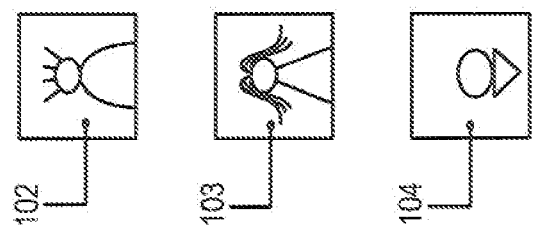
Fig. 1E

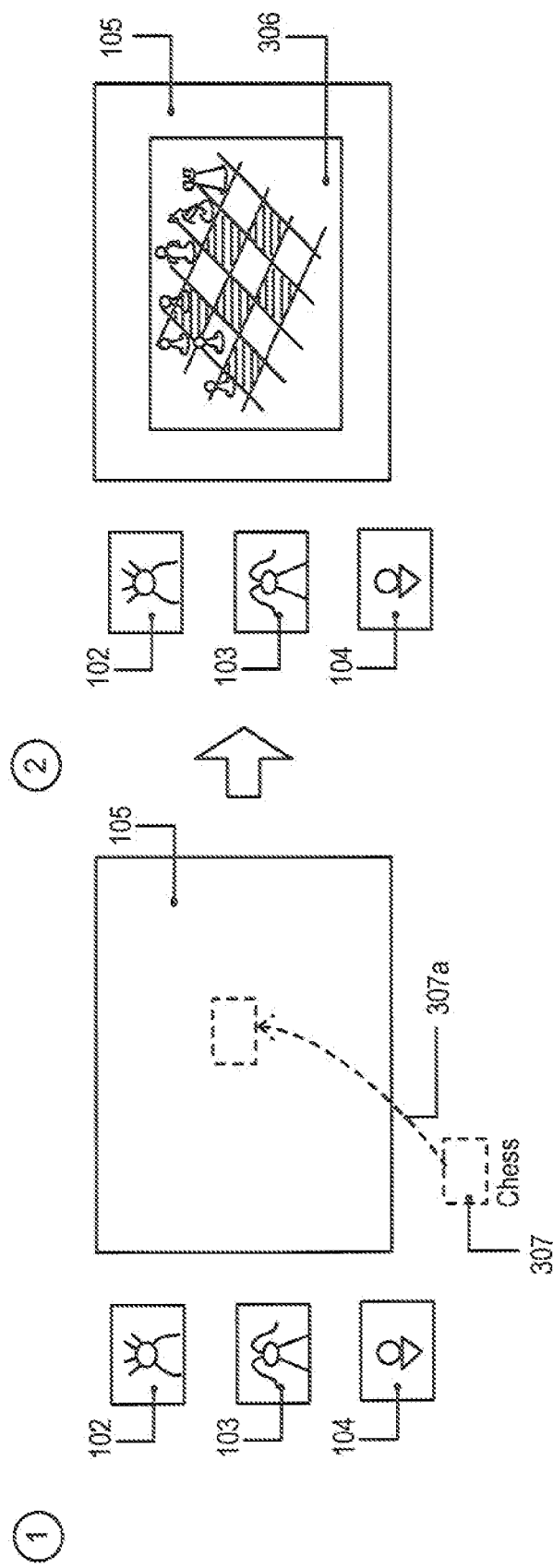

METHOD AND SYSTEM FOR DISTRIBUTED COMPUTING INTERFACE

The present application claims the benefit of and priority to U.S. Provisional Patent Application No. 61/098,682 entitled "Method and System for Distributed Computing Interface for Sharing, Synchronizing, Manipulating, Storing, and Transporting Data" filed on Sep. 19, 2008, and is hereby, incorporated by reference.

FIELD

The present system relates in general to computer applications and, more specifically to a method and system for distributed computing interface.

BACKGROUND

According to Opera Software ASA in 1997 around 85% of the time spent at a computer was spent using desktop applications. In 2007, about 70% of the time was spent using a web browser. The web browser has become the most commonly used human interface for using computing.

However, the ways people are using Internet services and the ways the internet services are provided in terms of underlying technology are changing. The three strong trends that demonstrate this ongoing change are Rich Internet Applications, Cloud Computing, and Mobile Internet Services.

Rich Internet Applications

As the browser is used for the majority of the time spent at a computer, users demand rich functionality of complex software to be available through the web browser. Examples of the functionalities include image editing, video processing, document processing, VoIP telecommunications, video conferencing, and distributed collaboration systems. Exisitng technologies (Adobe Flex, AJAX, Java Applets) enable the browser to run complex applications. Although such applications were developed for the web browser by a number of startup and large companies, the architecture and legacy of the web browser place several limitations on application performance, development ease and the user interface richness.

Cloud Computing

Companies in the cloud computing field are building infrastructure for cloud computing. As computing and storage have gotten cheaper hosting internet applications with massive usage (millions of simultaneous users) within a centralized data center has become possible. Such applications and data centers have been built by companies like Google (search, email), Yahoo (email), Salesforce.com (CRM). The next step was to build a set of application programming interfaces (APIs) around these datacenters to allow third party developers to host their applications on the robust infrastructures built and supported by large industry players. This new way of developing, deploying, providing and using Internet services and applications was named "cloud computing." Cloud computing was pioneered by companies such as Amazon with their Amazon Web Services initiative which started with S3 (APIs and service for cloud storage) and EC2 (computing). The followers included Google (Google Application Engine) and Microsoft (Live Mesh initiative).

Mobile Internet Services

With the introduction of convenient zoom-in/zoom-out multi-touch user interfaces on mobile devices with small screens, affordable pricing for unlimited Internet usage, fast data transfer capabilities on cellular networks (3G), built-in global positioning devices, photo and video cameras, powerful processors and large storage mobile devices are becoming the new and great platform for rich mobile Internet applications and services including cloud-based applications. No standard way of utilizing the computing and storage power of the cloud is available on mobile devices. The internet is accessed via custom web browsers built into mobile devices (Opera, iPhone) or third party applications that lack a standard approach for using internet services.

The web browser used to access cloud applications uses http and https-based protocols, placing a number of limitations on the capabilities of cloud computing. In particular the current cloud computing platforms fail to enable data synchronization between multiple application users, real-time streaming capabilities, and real-time collaboration capabilities. User interface is lacking to utilize capabilities provided by rich applications running in the cloud (cloud-based applications). Also, a browser cannot naturally offload data processing to the cloud (e.g. graphic rendering or CPU intensive jobs) and there is no way to make offloading transparent and seamless for the end user.

The web browser's underlying technological principles of operation and its architecture can no longer provide the best solution for certain crucial usage scenarios like—for example—sharing data, real-time collaboration around documents and media, working with applications executing in a distributed computing environment.

The web browser architecture places limitations on performance, user experience richness and ease of development of modern Internet applications.

The web browser architecture is not well-suited to work with cloud-based applications. In particular with those cloud-based applications including real-time communication functionality, data sharing and data synchronization among multiple users. The web browser does not address the need of emerging rich Internet applications and cloud-based Internet applications which include complex functionality on mobile device platforms Beyond the browser, there are a few methods that are commonly used by users to share the documents and collaborate. However, most of these methods/applications are even less convenient then the browser.

Users utilize email as the way to share documents as attachments but email has limitations such as the attachment size and difficulty of tracking document versions. FTP for document sharing does not enable real-time communication and collaboration.

Tools exist that work with one or a few file types, but do not address the sharing and collaborating around many rich media types such as pictures, music, videos, games, or applications. Existing collaboration tools do not provide support for cloud-based Internet applications.

Based on the above there is a need for an improved base application for using Internet services with a different user interface and architecture better suited to answer the emerging needs such as the richness of Internet applications, support for and taking advantage of cloud computing applications and utilizing these two trends on the emerging mass market mobile device platforms.

SUMMARY

A method and system for distributed computing interface are disclosed. According to one embodiment, a computer implemented method comprises accessing a collaborative interface, wherein the collaborative interface comprises persistent shared space, wherein visual representation of the collaborative interface is identical for each client accessing the collaborative interface. In a single action, an object is dragged into the collaborative interface and the object is displayed in real time in the collaborative interface. The object is accessible to other clients in the collaborative interface and the state of the object is continuously synchronized. The object is manipulated in the collaborative interface and other clients accessing the collaborative interface are viewed.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

FIGS. 1a-h illustrate single-action drag-in interfaces for sharing data objects among several users and storing the data in a distributed computing system according to various embodiments.

FIG. 2 illustrates a single-action drag-out interface for storing shared data on a local computer, according to one embodiment.

FIGS. 3a-c illustrate single-action drag-in interfaces for starting a shared data manipulation session with multiple users around an application running on a local computer of one of the participants, according to one embodiment.

FIGS. 4a-b illustrate single-action drag-in interfaces for starting a shared data manipulation session with multiple users around an application running in a distributed computing system, according to one embodiment.

DETAILED DESCRIPTION

Figure 1A:
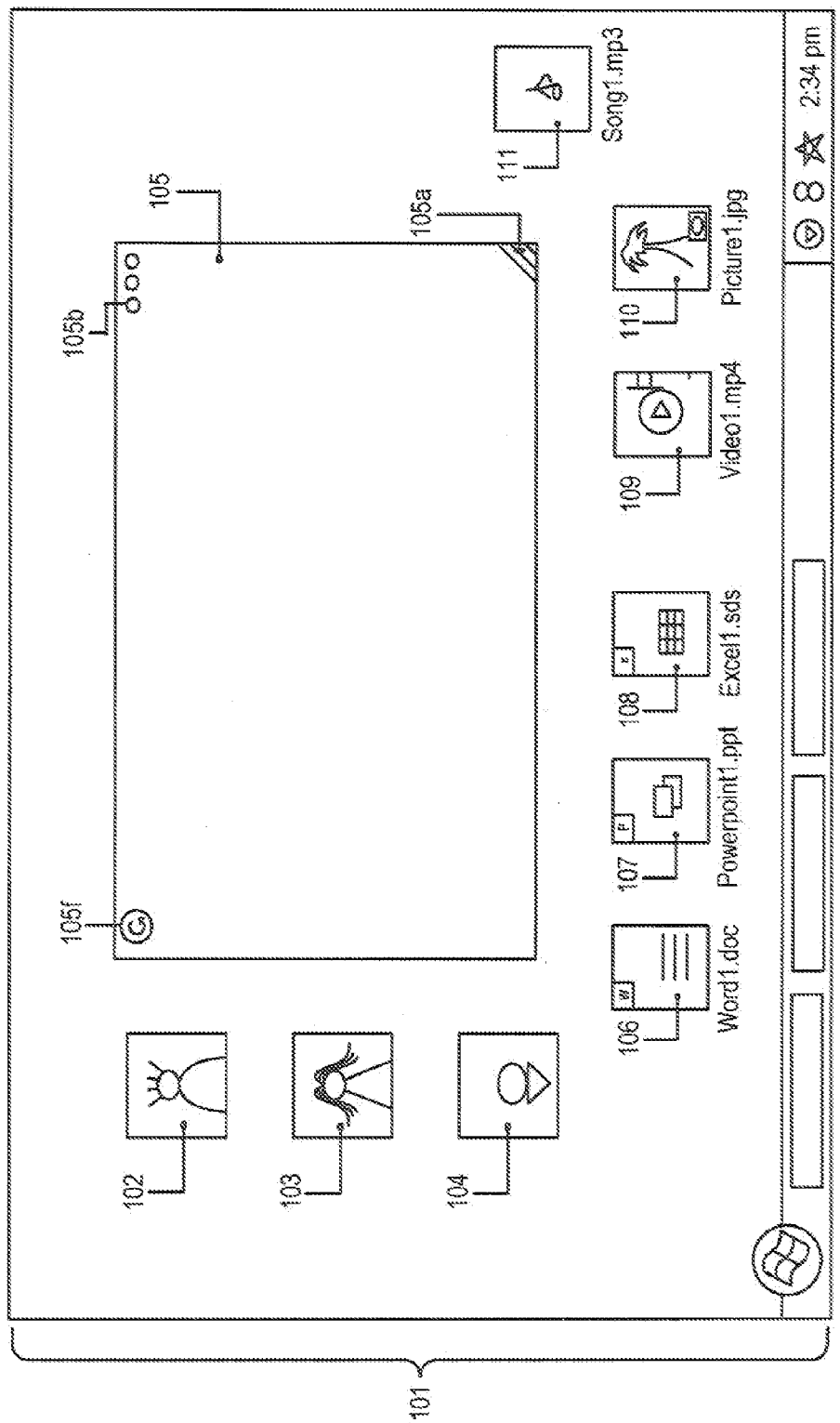

A method and system for distributed computing interface are disclosed. According to one embodiment, a computer implemented method comprises accessing a collaborative interface, wherein the collaborative interface comprises persistent shared space, wherein visual representation of the collaborative interface is identical for each client accessing the collaborative interface. In a single action, an object is dragged into the collaborative interface and the object is displayed in real time in the collaborative interface. The object is accessible to other clients in the collaborative interface and the state of the object is continuously synchronized. The object is manipulated in the collaborative interface and other clients accessing the collaborative interface are viewed.

In the following description, a new term "c-space" is utilized when referring to a shared collaboration space.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

As will be appreciated, the teachings of the present invention can be readily implemented on a variety of computing platforms including mobile and portable platforms, the personal desktop simply being a convenient paradigm for discussion. Additionally, the wide variety of features and functionality described below are optional and implementation dependent. Those skilled in the art will readily understand which features are suitable and required for any specific implementation.

FIG. 1a illustrates a personal computer desktop (101) on which a C-Space shared space area (105) is open, according to one embodiment.

The shared space 105 includes images or videos representing Users (102, 103, 104) participating in a data sharing and manipulation session. By way of example, a number of files and documents are represented, all of which can be shared by participating users during a sharing session in a shared space:

106 Rich text document (e.g. a Microsoft Word .doc file or an Open Office document)

107 Presentation (e.g. a Microsoft PowerPoint file or an Open Office presentation)

108 Spreadsheet (e.g. a Microsoft Excel file or an Open Office spreadsheet)

109 video file (in this case, mp4)

110 image file (in this case, jpg format)

111 audio file (in this case, mp3)

The shared space (105) may provide various ease of use functionality. For example, the shared space 105 may be resized using the resize control in the lower right corner (105a.) The shared space 105 may also be minimized, closed or maximized to occupy all the available viewing area of the shared space (105) using controls (105b) on the upper right corner. A flip control (105f) can be used to see the files stored in a distributed computing system, as well as using these stored files in a distributed data session.

Figure 1B:
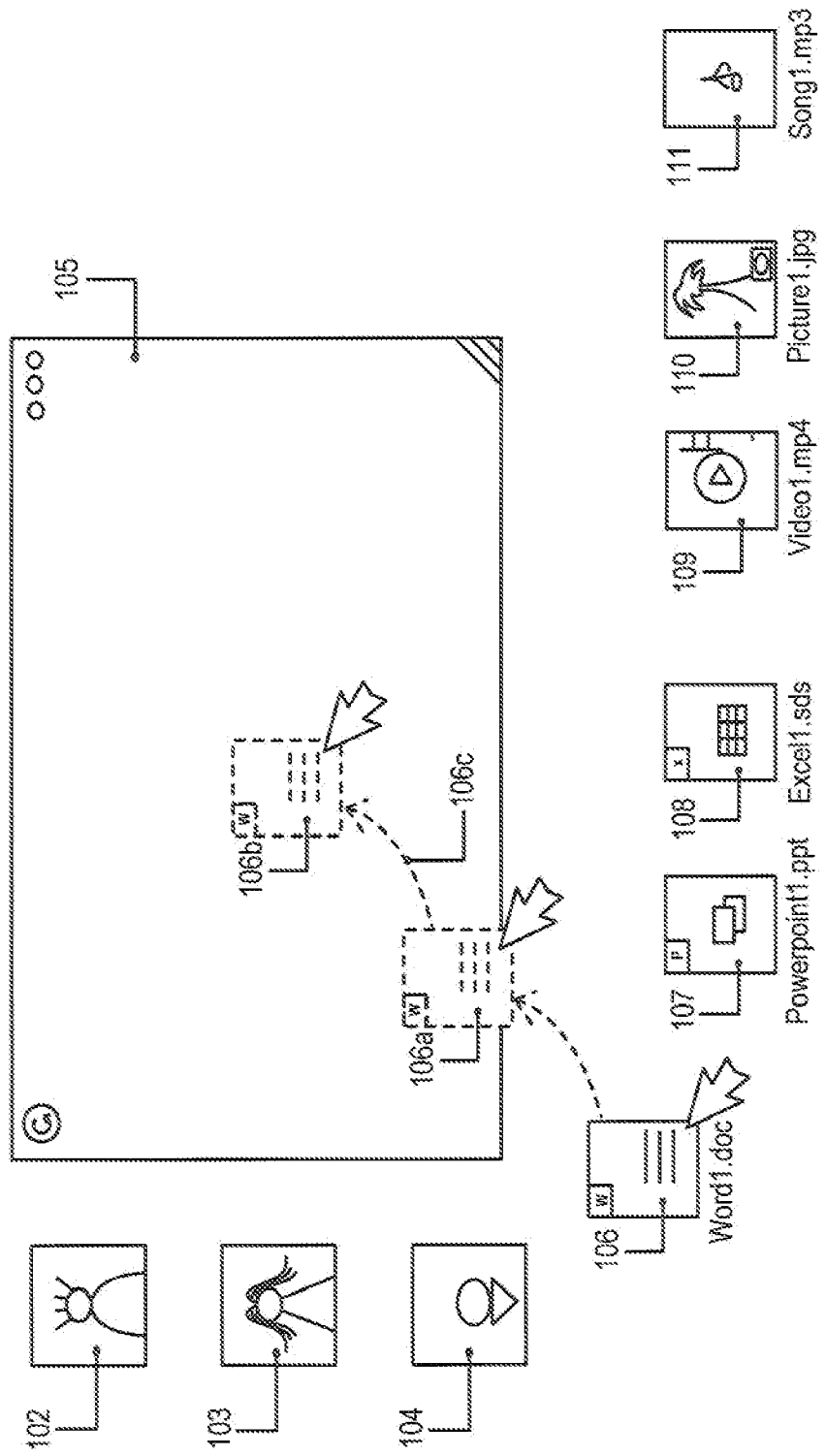

FIG. 1b illustrates a single-action dragging interface for sharing data objects among several users in a data-sharing session, according to one embodiment.

In the scenario depicted above, User 102 wishes to share the Word document (106) on his personal computer desktop. User 102 selects the document and drags it from the PC desktop into the open shared space (105.) The path of the dragged file is shown by images 106a-c. The other documents shown (107-111) can be shared in a similar way.

Figure 1C:
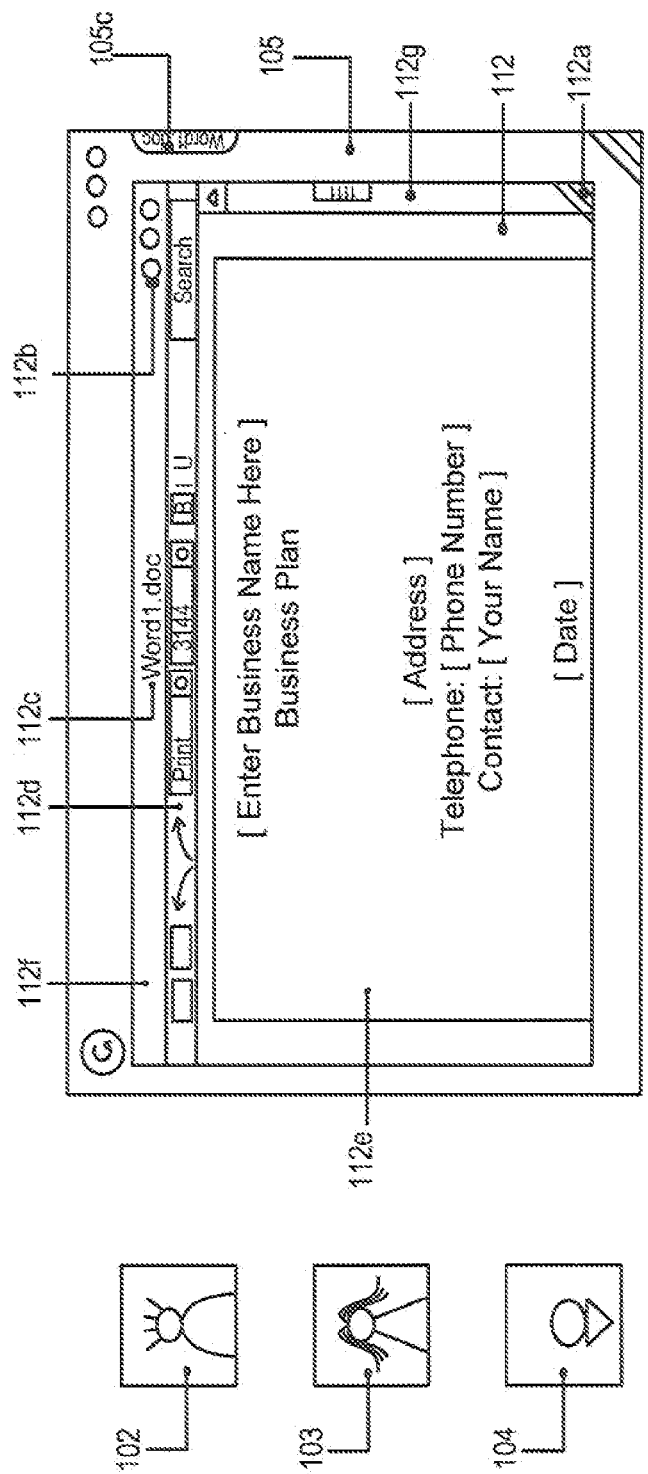

The user drags a document into their shared space (105), and it occupies the available viewing area of the shared space (105) and presents to each shared space session participant as shown in FIG. 1c. As will be appreciated, dragging is one embodiment for introducing an object into the sharing space, the user may be provided additional and/or alternative mechanisms for initiating a sharing session.

FIG. 1c illustrates a data-sharing and data-manipulation session among multiple users with a Word document shared in a C-Space, according to one embodiment.

In this example, Users 102-104 (represented by images or videos) are sharing a Word document in shared space 105. Once the document has been dragged or otherwise brought in, the document is represented as a viewer (112) and occupies the entire available shared-space (105) to maximize the shared experience. Each User, here Users 102-104, see exactly the same content and exactly the same view of the document as the other users participating in the session; the view of the shared space is also synchronized over time among the participants of data sharing and manipulation session. Other embodiments of the present invention may enable asynchronous operations, or support security measures which place limits on information sharing, and/or provide other ways of sharing data not necessarily in an absolutely synchronous manner.

The file viewer (112) can include the following parts:

112a—resizing element

Figure 1D:
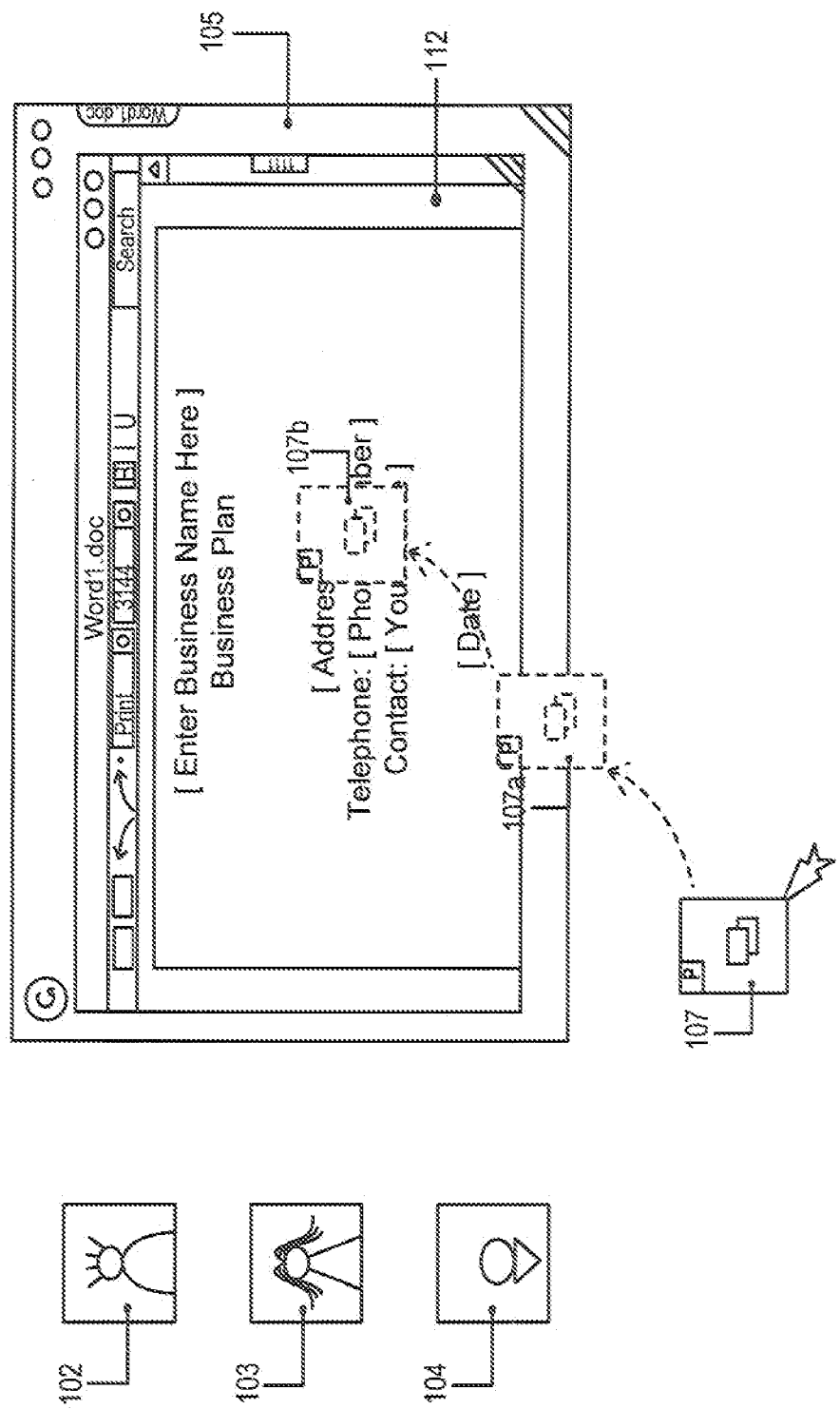

112b—elements that allow the document to be maximized, minimized or closed within the shared space 112f—toolbar which allows the document to be dragged around within the shared space, as well as allowing the document to be dragged out of the shared space 112c—bar showing the document file name 112d—toolbar with controls for basic document manipulation and editing 112e—document content FIG. 1d illustrates the functionality of including additional files within a C-Space data-sharing and data-manipulation session, according to one embodiment. In this example, Users 102-104 (represented by images or videos) participate in a data-sharing and data-manipulation session. User 103 wishes to share the PowerPoint document (107) on her personal computer desktop while a Word document is already being shared and occupying the shared space (105). User 103 selects the PowerPoint presentation and drags it from the PC desktop into the open shared space (105.) The path of the dragged file is shown by images 107a-b.

Once the dragging is complete, the PowerPoint viewer is presented synchronously to all participants of the data-sharing session. In addition, the Word document previously being shared is no longer visible. As with the shared Word document, the PowerPoint viewer occupies all the available viewing area of the shared space (105) and presents to each shared space session participant as shown below in FIG. 1d. Of course, other embodiments could simultaneously display multiple simultaneously shared documents, and/or a user could be involved in multiple C-Space sessions simultaneously.

FIG. 1e illustrates a data-sharing and data manipulation session with a PowerPoint presentation shared among session users 102-104, according to one embodiment. In this scenario, the PowerPoint presentation has been dragged into the session over a previously shared Word document. The PowerPoint presentation viewer (113) occupies the entire shared space. The word document is obscured from view and represented as a small tab (105c) labeled with the document's name. The newly shared PowerPoint presentation is also represented by a tab (105d). On mouse-over, such file tabs display a close button.

Figure 1F:
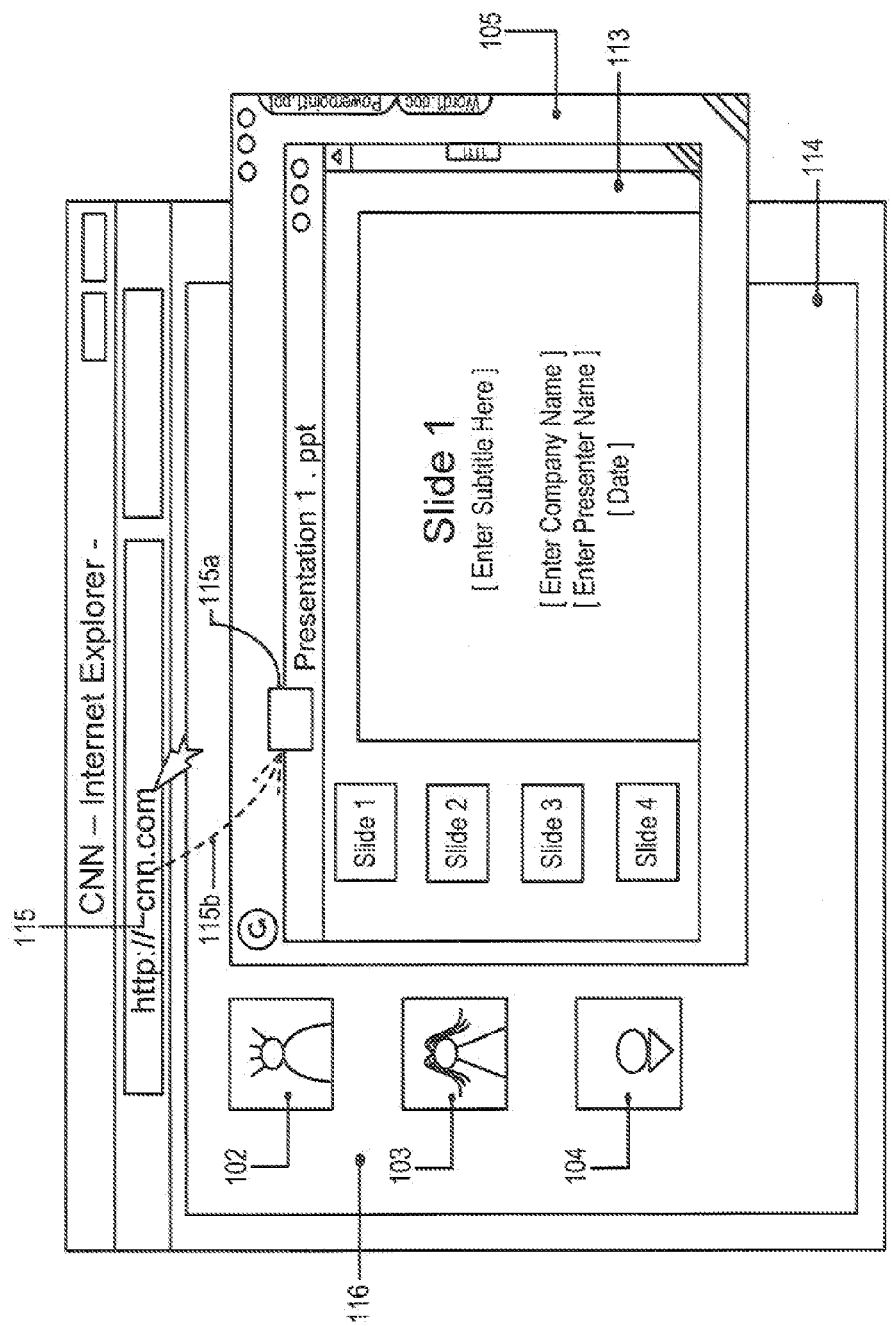

FIG. 1f illustrates a single-action dragging interface for sharing a browser session among multiple participants in a C-Space data-sharing session, according to one embodiment.

The shared space contains images or videos representing Users (102, 103, 104) participating in a data sharing and manipulation session. User (104) wants to share a web browser session and opens a web browser and navigates to a web page on his personal computer desktop. User 104 initiates shared browsing by dragging the Internet address link (115) into the shared space, shown with FIGS. 115a-b.

Within the shared space, a shared browser viewer, directed to the desired Internet address, opens. The shared viewer is constantly synchronizing among the data-sharing and data-manipulating session participants.

Note that the Internet browser viewer shows navigation buttons (117a), a URL address field (117b) and a bookmarks bar (117c.)

Figure 1G:
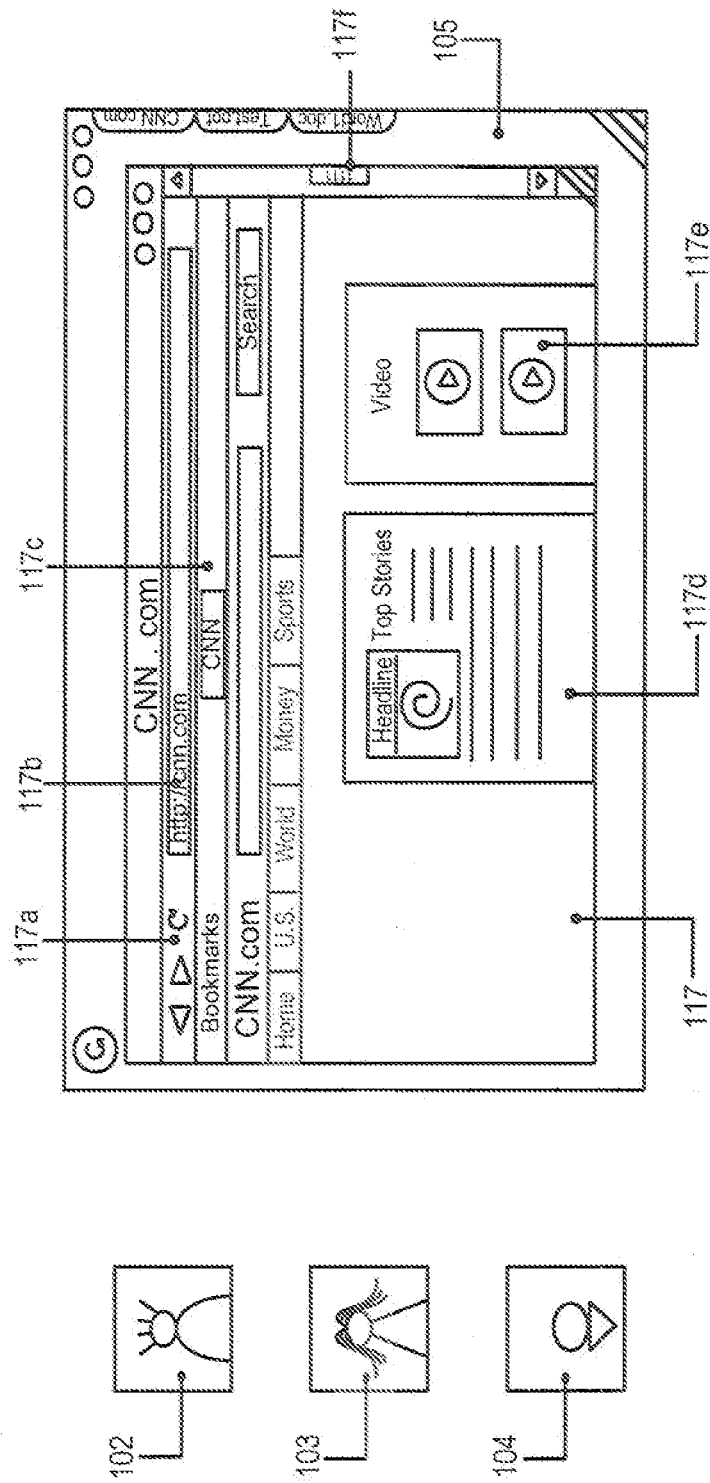

FIG. 1g illustrates a shared browsing session using C-Space, according to one embodiment. Three users (102-104) are participating in the data-sharing and data-manipulation session, though C-Space allows for fewer or many more participants. The shared space, which is in a state of constant synchronization among participants of the shared session, is labeled 105.

The browser viewer (117) is a simplified browser distinct from standard browsers in that it is hosted within the shared session. Each time a user clicks a web page element within the browser viewer, the view is synchronized among the shared session participants.

The browser viewer (117) can include the following parts:
117a—navigation buttons, which may include back and forward buttons, a refresh button, and other standard buttons.
117b—address bar, which also serves as a search bar
117c—bookmark bar
117f—scroll bar The browser itself is synchronized across participants of the collaborative session and can display audio files, video files, and flash animations; can process JavaScript as well as regular HTML pages and.

Figure 1H:
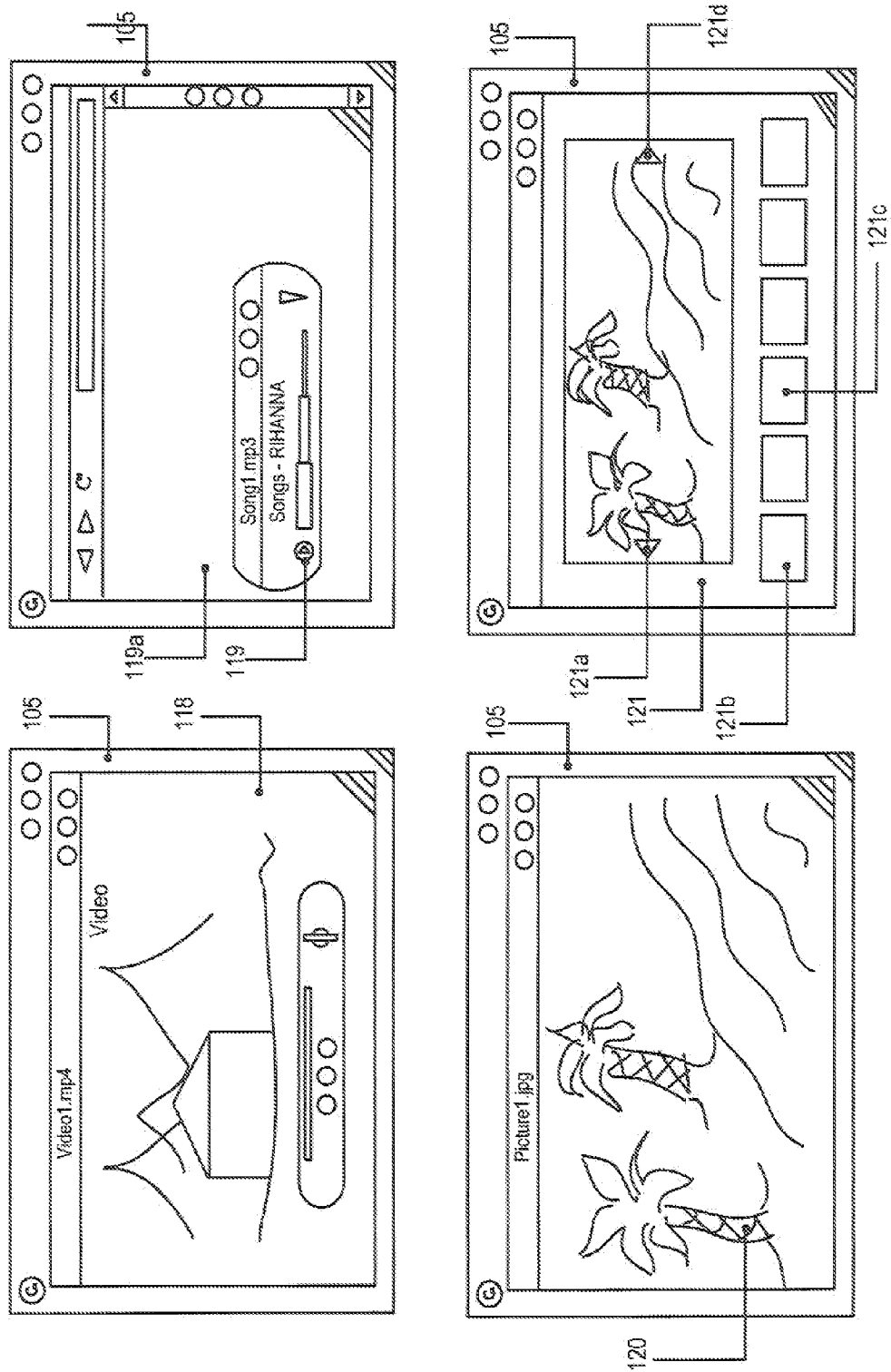

FIG. 1h illustrates sharing sessions for the following types of content, according to one embodiment:
118—video
119—music
120—image
121—folder of images All the listed data object types are shared within C-Space data-sharing and data-manipulation sessions by a simple single-action dragging interface. A User can drag a file or a folder of files from his PC desktop into the shared space and it will open with a viewer of the corresponding data type. Additionally, these objects can be activated from a storage location on a distributed computing system (shown in subsequent examples).

Figure 2:
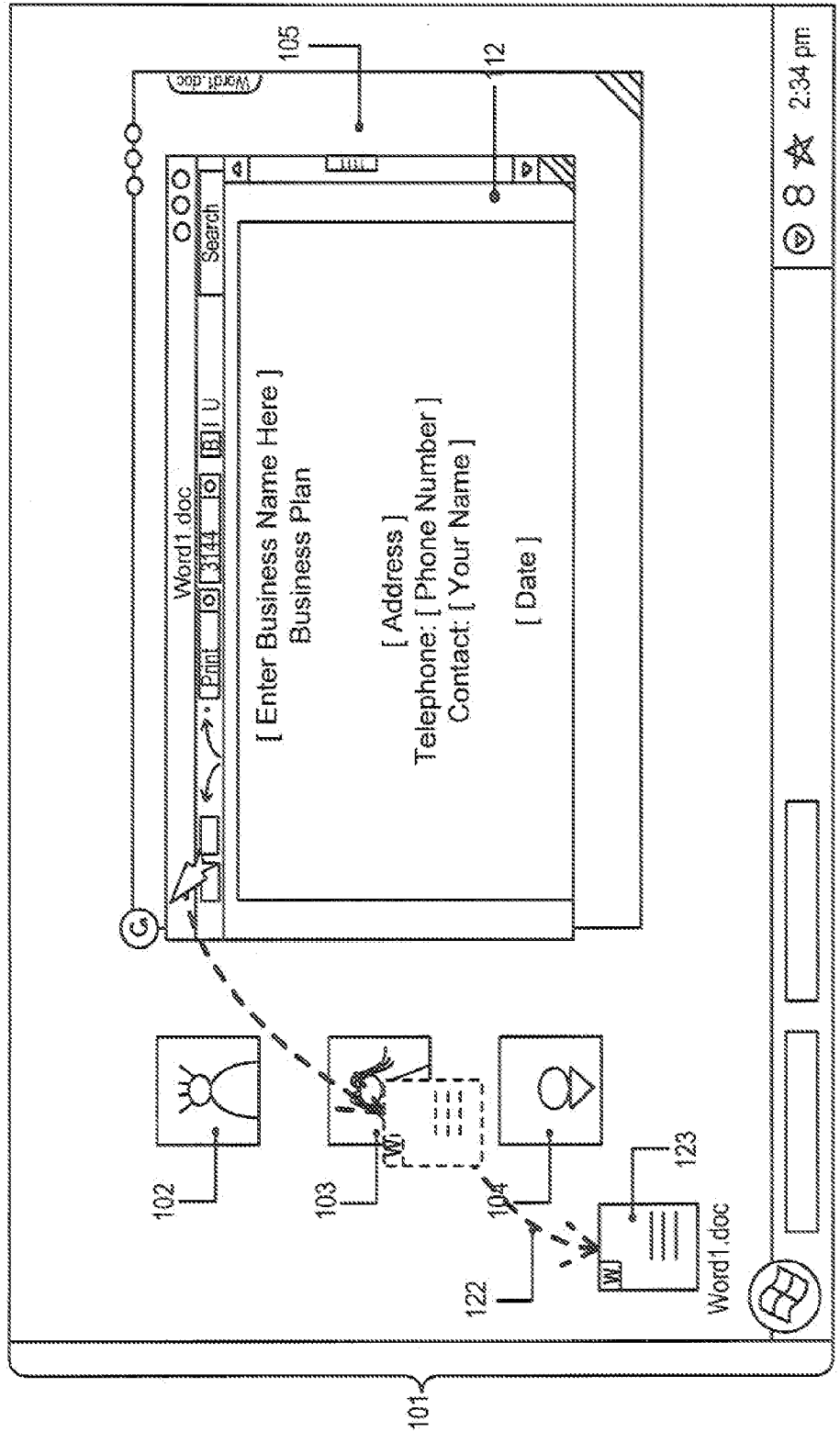

FIG. 2 represents the single-action drag-out interface for storing shared data from a data-sharing and data-manipulation on a local computer, according to one embodiment.

The shared space contains images or videos representing Users (102, 103, 104) participating in a data sharing and data manipulation session in a shared space (105). The Users are sharing a Word document (112) which is visible to all session participants from the viewer in the shared space. As always, this document is synchronized between the participants of the session.

User (104) wants to save a copy of this shared document (112) to his own PC desktop for reference. He clicks the document header and then drags it from the shared space onto his PC desktop, shown with FIGS. 122-123.

While the shared document remains available to the session participants in the viewer, User 104 will have saved a local copy of the file on his own computer desktop.

Figure 3A:
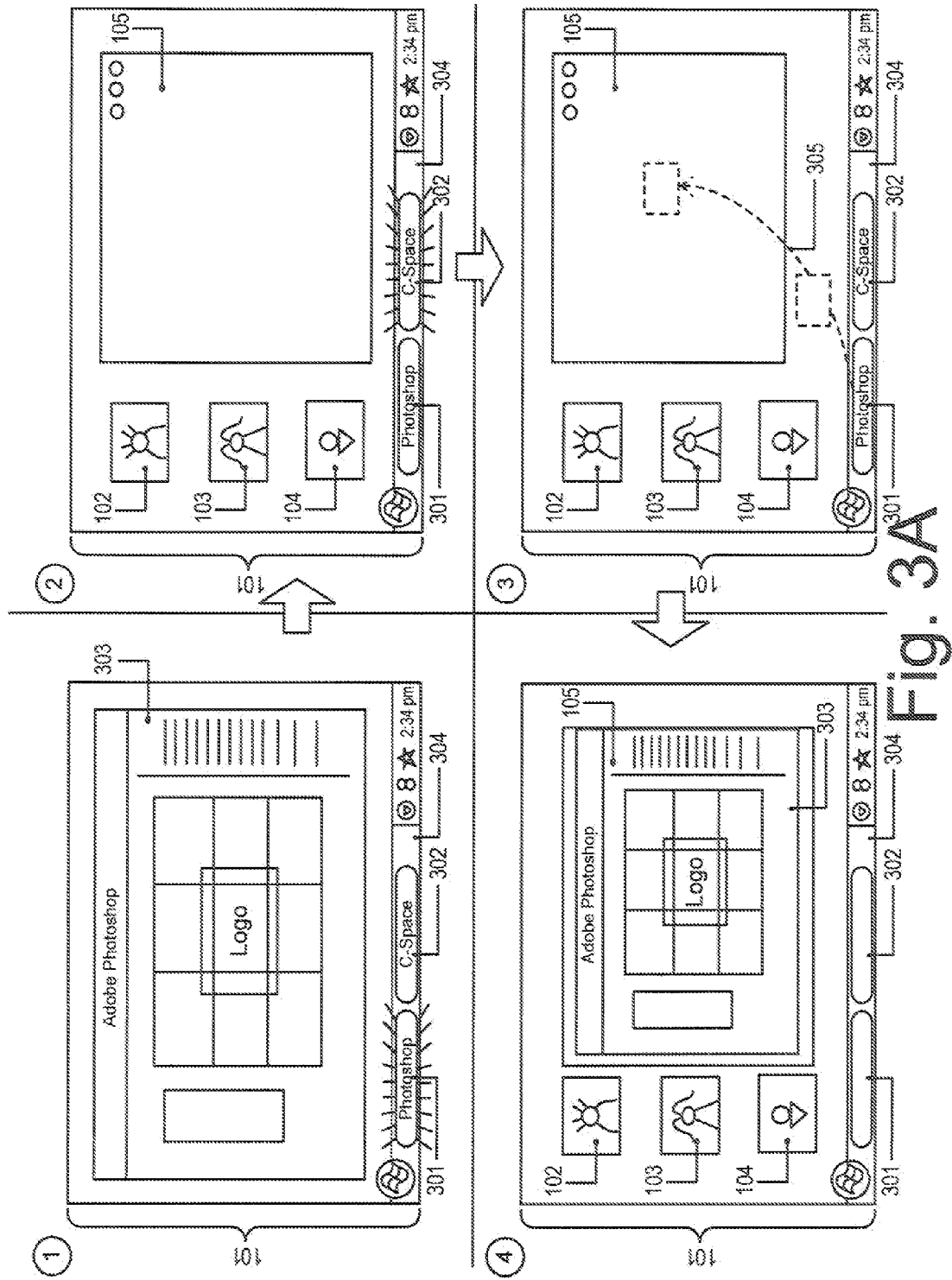

FIG. 3a represents the first variant of the single-action dragging interface for starting a shared data-manipulation session with multiple users around an application running on a local computer of one of the participants, according to one embodiment.

A user accesses a Windows desktop 101. A User (103) participating in a collaborative session has Adobe Photoshop running on his local personal computer (303), which is represented on the local taskbar (304) by an icon (301.) The active C-space session is also represented by an icon (302) on the taskbar.

To begin sharing the local Photoshop application among other C-space session, User 103 selects the C-Space icon in the taskbar (302) and drags it into shared C-Space session (305.) A visual representation of the Photoshop application opens immediately within the shared space (105,) where all session participants (102-104) can see the open Photoshop application. Each user will be able to manipulate and control the open application in synchronized real time. In this way, they can collaborate using the open application; for example, running a tutorial, collaborating on a design project, or otherwise collaborating using the application.

FIG. 3b illustrates a single-action dragging interface for starting a shared-data manipulation session around an application running on the local computer of one of the session participants, according to one embodiment. Participants of the session (102-104) are collaborating using shared space (105) and one of them wants to start an application sharing session, which they can initiate by dragging an object that represents the application, labeled (307), into the shared space. The object can be a short-cut, an executable file, or a flash file which can be interpreted as an application by the shared space.

User 104 drags an object (307) into the shared space (105,) shown as dragging path 307a. The application begins to run in an application viewer 306.

Figure 3C:
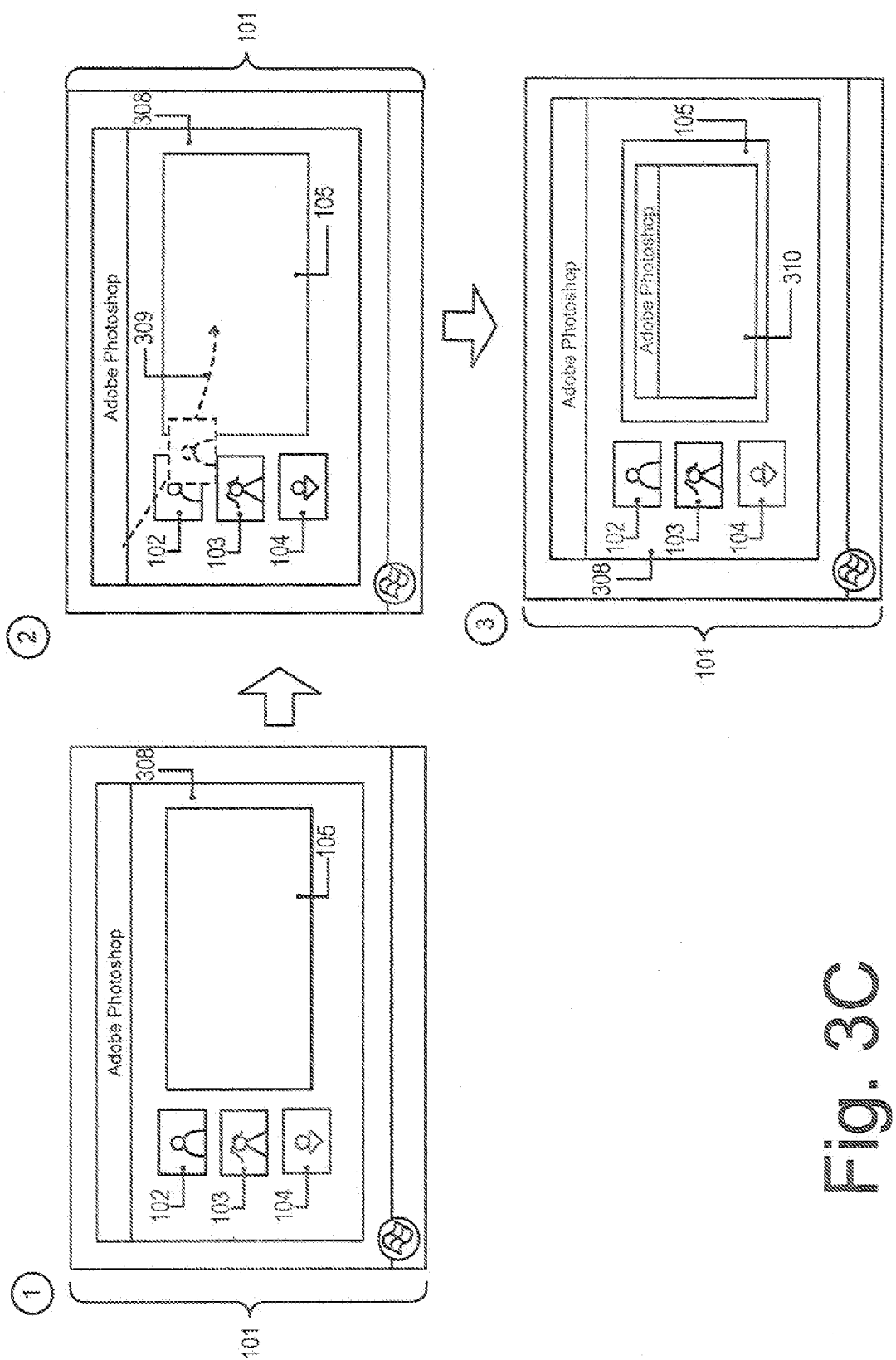

FIG. 3c illustrates a variant of the single-action dragging interface for starting a shared data-manipulation session using an application which is running on the local computer of one of the participants, according to one embodiment.

On computer desktop (101,) one of the Users (102) has an application running, such as an Adobe Photoshop file (308.) User 102 also has a C-Space collaborative session (105) running.

User 102 selects the Photoshop application (308) and drags it (illustrated by FIG. 309) into the C-Space session (105.) User 102 continues to have the application running locally. In addition a visual representation of the Photoshop application is visible to all session participants (102-104) and the application is fully operational and constantly synchronized among all the participants.

Figure 4A:
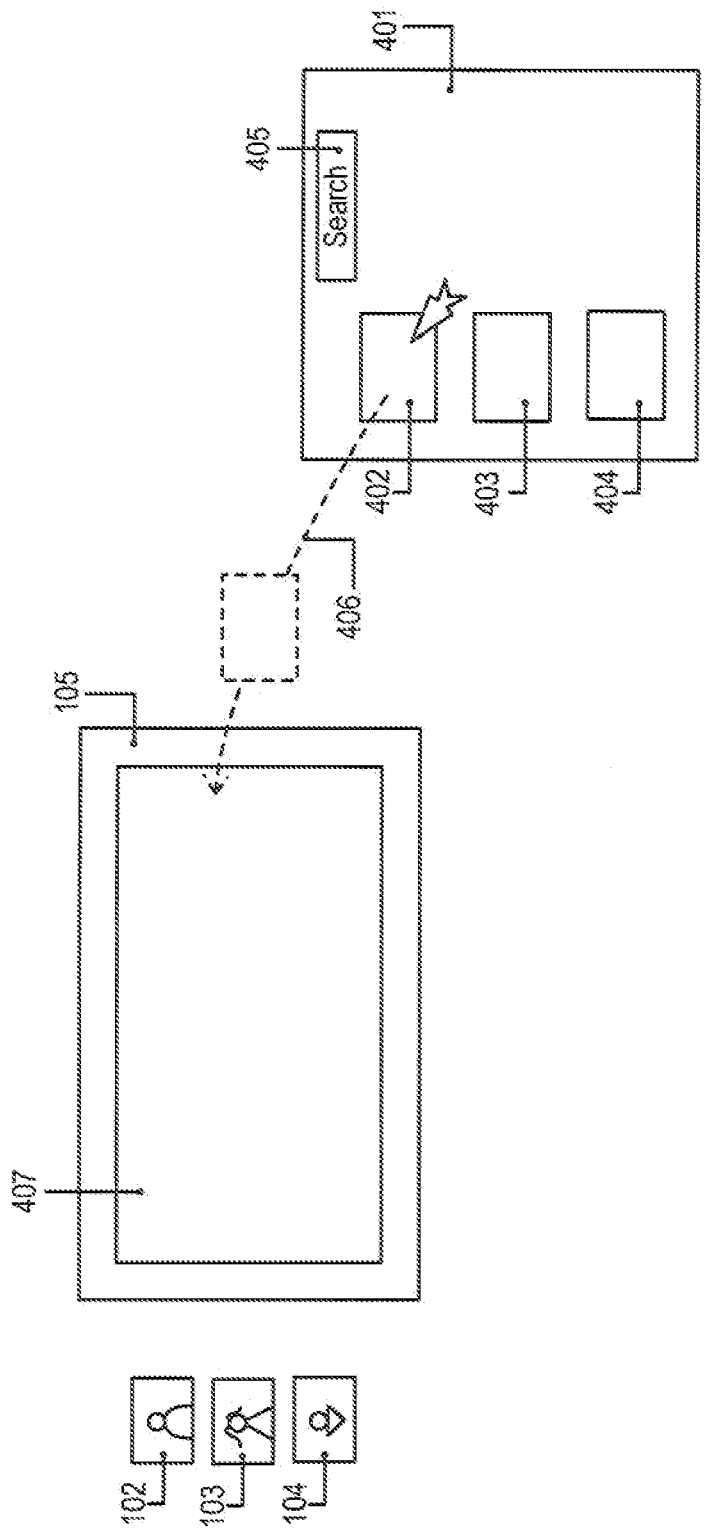

FIG. 4a illustrates a single-action dragging interface for starting a shared data-manipulation session using an application which is running on a distributed computing system, according to one embodiment.

A C-Space is running with Users 102-104 participating in a collaborative session using C-Space 105. One of the users wants to start a data-manipulation session which would utilize an application running in a distributed computer system, and activates an application repository user interface control (401.) This control includes all of the applications which are working in a distributed application system which is used by the C-Space interface.

The applications shown here are represented as 402-404 and can include a visual representation of the application as well as textual descriptions. The application repository control can have a search element (405) that allows session participants to search all of the available applications running in the distributed computing system.

To share an application running on a distributed computing system, the User clicks the application icon on their local desktop and drags it into shared space (105): the dragging path is shown as FIG. 406. As the application is dragged into the shared space, the application activates and begins the data-manipulation session in which Users 102-104 are participating. The view inside the application shared space (407) is synchronized among all the collaborative session participants. The application is working in a distributed computing system, rather than locally. Though some resources may run locally on session participants' local computers, a significant portion of resources run on the distributed computing system.

Figure 4B:
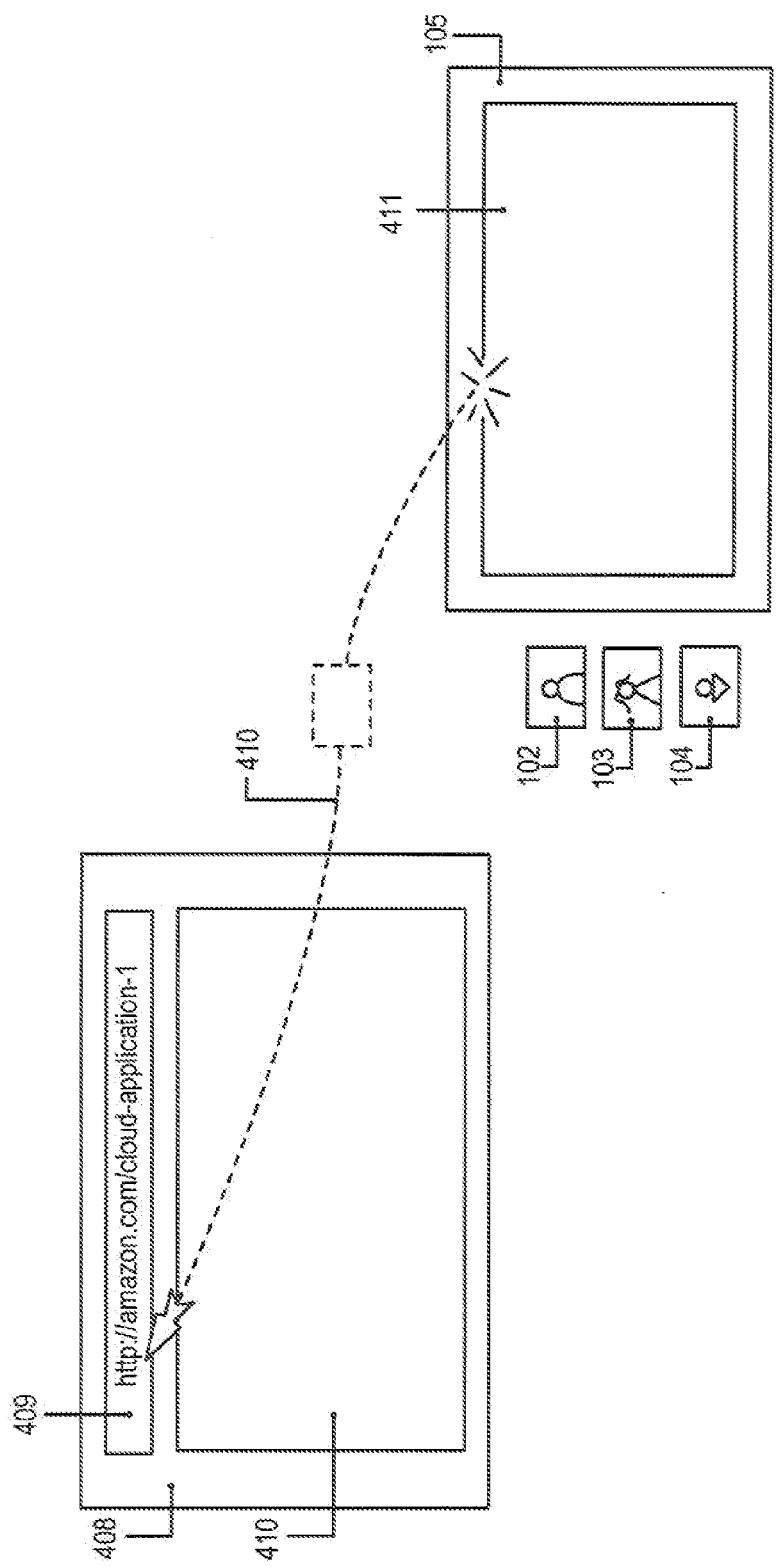

FIG. 4b illustrates a single-action dragging interface for starting a shared data-manipulation session using an application which is running on a distributed computing system, according to one embodiment.

One way to access an application which is running on a distributed computing system is via a unique resource locator a URL, which can be used to access an application via a browser in many applications that support access thru the Internet and web browsers. It can be used to access them as a web service using send protocols.

The application can be shared in a collaborative session in which Users (102-104) are collaborating by dragging URL (409) from a local web browser (408) into collaborative shared space (105.) The dragging path is illustrated in FIG. 410. Once the URL is dragged in to the collaborative space, if C-Space recognizes and is able to work within the application's standard protocols, the URL link expands into an application running within the collaborative session. All users see a synchronized view of this application and they can work with and manipulate data within this application.

Figure 5:
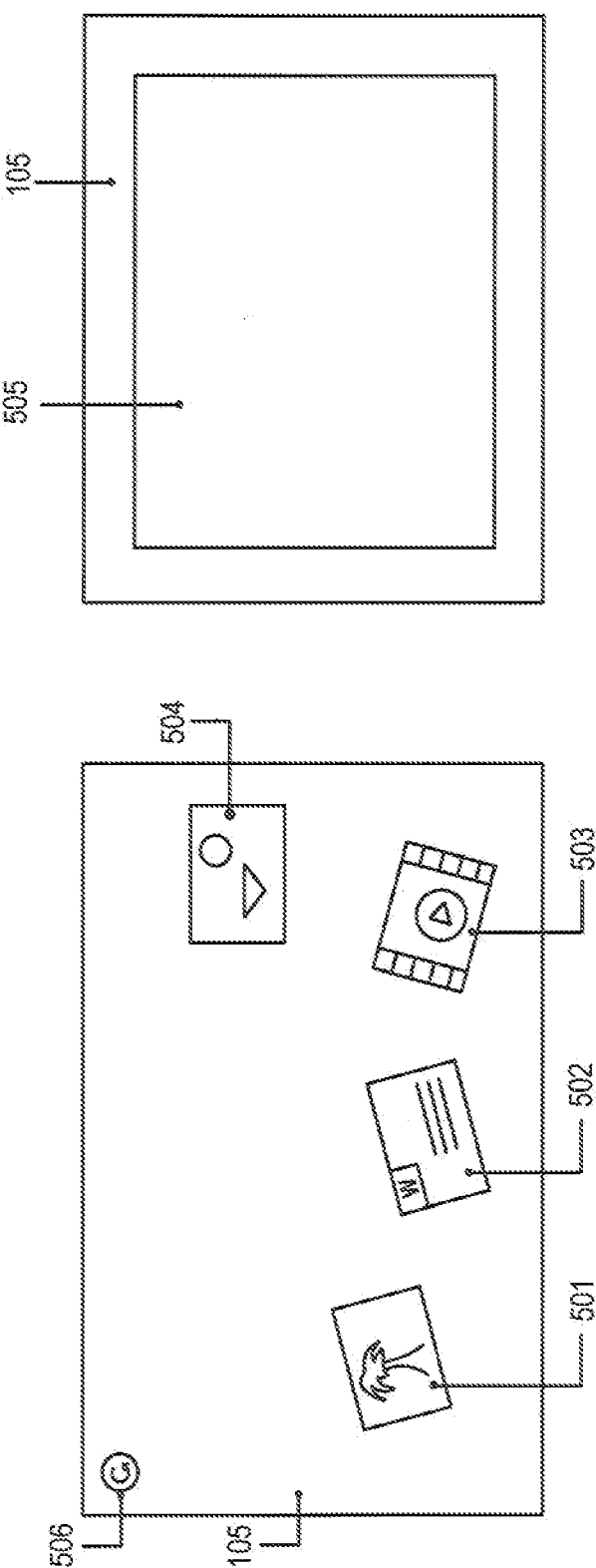
FIG. 5 illustrates viewing and managing multiple objects in a data sharing and manipulation session, according to one embodiment.

FIG. 5 illustrates viewing and managing multiple objects in a data-sharing and manipulation session within a shared space, according to one embodiment. The shared space (105) which contains multiple objects (501-504) such as media types, data objects, pictures, audio, video, and applications: such as java and flash apps. The shared space also has a flip button, 506.

Icons in the shared space are shared among all the participants of the shared session: all the participants see how icons are arranged in the shared space, can move them around, can change display size and can activate them. Objects or applications are activated when a session participant clicks on the icon in the shared space. A viewer for the appropriate data object opens, represented here as 505.

Users can delete data objects from the shared space by right clicking on icons representing these objects in shared space (105) and selecting Remove option from the context menu. Users can also move them around within the shared space, and can move them in and out of the shared space (105). Copy on desktop icon remains in shared space (105). User can access data files stored in the storage subsystem of the distributed computing system in a data sharing session through C-Space interface.

Figure 6:
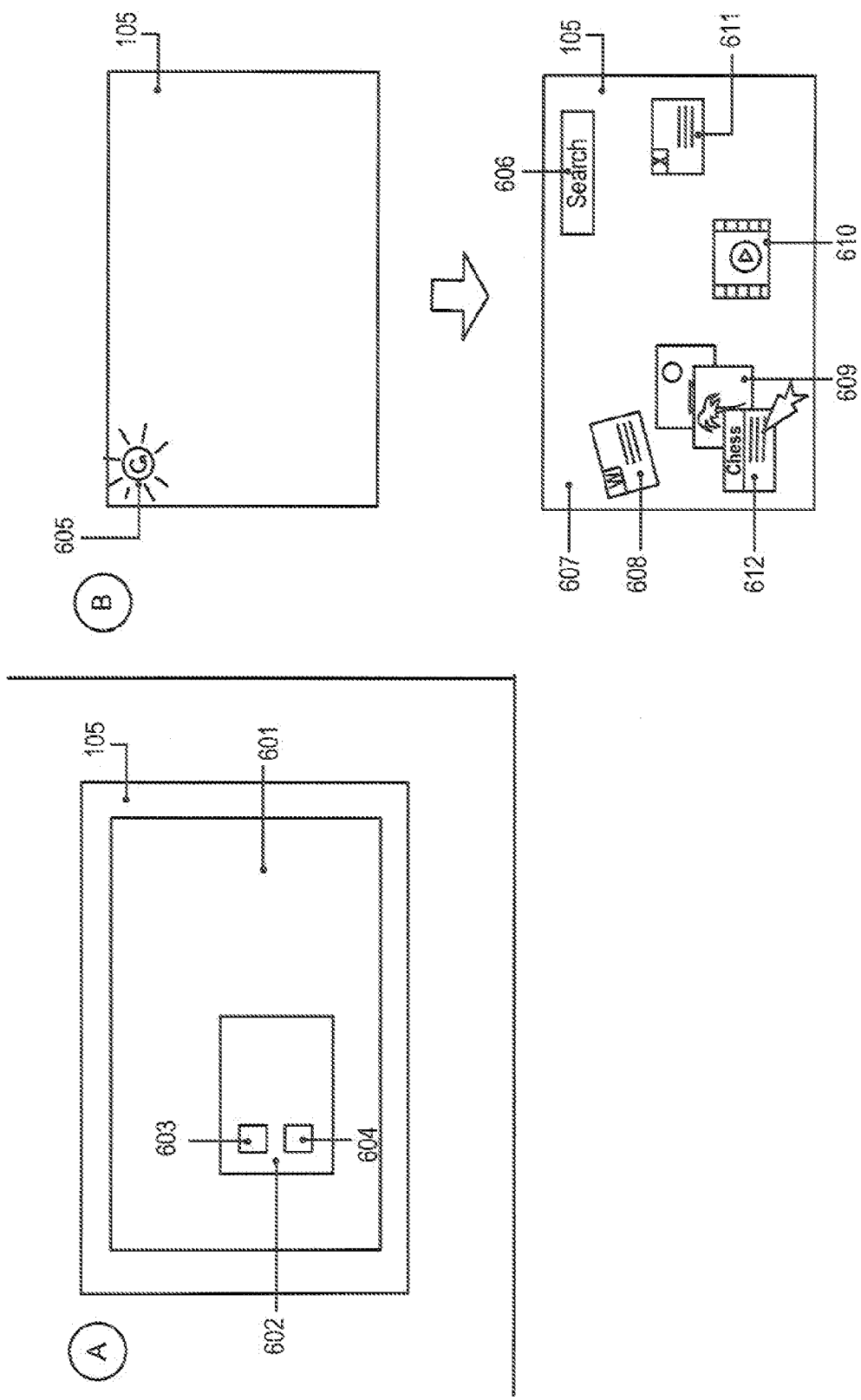
FIG. 6 illustrates accessing data objects stored in a distributed computing system and sharing them in a data sharing and manipulation session, according to one embodiment.

FIG. 6: Accessing data objects stored within a distributed computing system and sharing them in a data manipulation session, according to one embodiment.

The shared space presents remote files and data as if they were on the User's local machine. A shared space 105 has an application (601) running inside of it. The application may access data stored in the distributed computing system, which the shared space allows it to do seamlessly.

An area 602 exists where a User chooses files they want to manipulate. In this case the files are data objects. 603-604 illustrate files or objects located in a remote distributed computing system.

Another way for Users to access and manipulate data files stored in a remote distributed computing system while in a C-Space shared session is to use the "flip" button (FIG. 6, 605). Clicking it makes the C-Space appear to flip and shows the file structure of stored objects and files (Word documents, Excel spreadsheets, PowerPoint presentations, images, movies, etc) within the C-Space's cloud storage system. Not only can Users can navigate this file storage system as with any standard file storage structure, but its use is full incorporated into the data-sharing and data-manipulation functionality of the C-Space.

Users can use a search field 606 to find a specific object stored in the cloud storage system. Objects can be activated to add to a data-sharing and data-manipulation session in progress by right-clicking the object and selecting from the menu. Once activated within the session, all participants can synchronously see, edit and otherwise manipulate the file.

Figure 7:
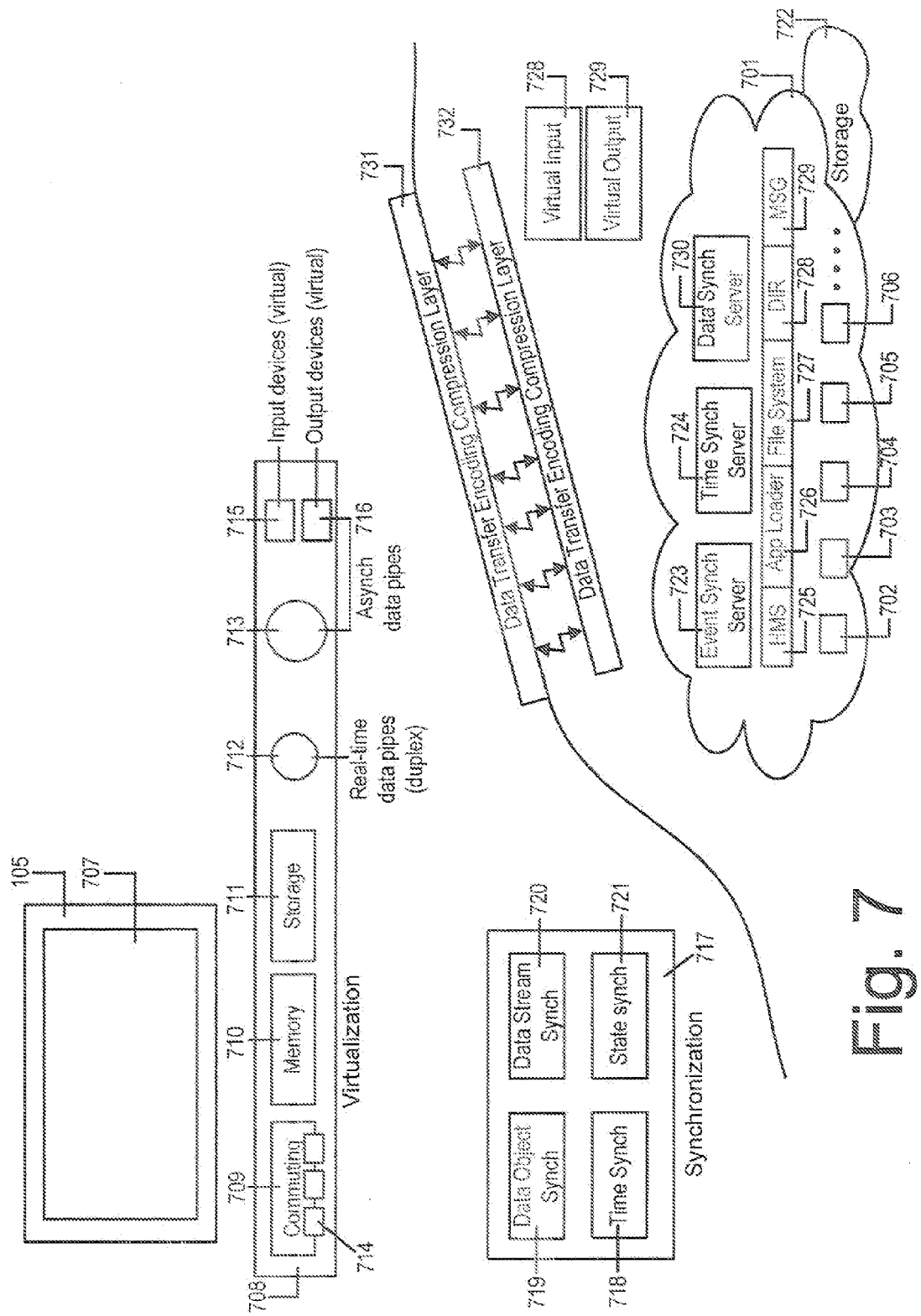
FIG. 7 is a block diagram illustrating an embodiment of the present system.

FIG. 7 is a block diagram illustrating an embodiment of the present invention in the form of an architectural diagram, according to one embodiment.

A shared space (105) has an application (707) running. On the left, the client running on a shared space User's PC is shown. On the right is a diagram of the cloud, a distributed computing system with multiple processing units (701-706) which can be actually separate computers, which can be hosted in a data center, networked, talking to each other and/or having attached storage (722.)

The distributed computing system has the following components/subsystems:

105 Shared space

707 Application running in shared space

725 Host Manipulation System 725 manages the computing instances of the distributed computing system. HMS which would spawn and stop computers from running and stopping execution 726 Application Loader, which would load the code to execute in the distributed computing system and can enforce data security and shared access requirements for the code being executed execute 727 Virtual File System—however each of the processing units have their own OS, their own file systems, memory and graphics cards—but this is a virtual file system with can be used by an application which is working in the cloud, so they would use this like layers of an OS.

728 Directory Service—to be able to find software and capabilities and APIs available in the distributed computing system. So this is like an API (application programming interface) not a human interface but an interface for a machine to be able to operate, to use the distributed computing system.

729 Messaging System

There are also a number of important components that are crucial in synchronizing the UI to the distributed computing system:

723 Advanced Synchronization Server

724 Time Synchronization Server

730 Data Synchronization Server

There is also a range of virtual devices and applications that can be running in the distributed computing system. The distributed computing system interprets these as natural devices, such as input devices (like a mouse, keyboard, or microphone) or output devices (monitor, speakers—mainly graphical and sound output.)

728 Virtual Input Devices

729 Virtual Output Devices

Data Transfer Encoding Compression Layers (731-732) make communication between the distributed computing system and the client using it more efficient, more secure and generally operating very well.

The Client has a shared space (105), is a paradigm of operation in applications using the distributed computing system (707) The applications can be launched and activated. Data objects can be started which can be utilized. The client UI for data manipulation and data synchronization has the following capabilities, according to one embodiment:

A Virtualization Layer (708) consists of the following components:

- 709 Computing Unit
- 710 Memory
- 711 Virtual Storage—virtual storage which can really be unlimited. The application treats it as a local hard drive, but in fact it is storage that is relying on the distributed computing system
- 712 Real-Time Data Pipes (Duplex)—Uses a very complex and precise algorithm and results in very tight synchronization
- 713 Asynchronous Data Pipes—for loading and transferring data, as well as communicating. Very secure, but neither built for speed nor synchronization.
- 714 Virtual Memory—not the memory of the computer but that of the distributed computing system
- 715 Virtual Input/Output Devices—captures output from an
- 716 application running in a distributed computing system and captures input from C-Space user interface clients.

Figure 8:
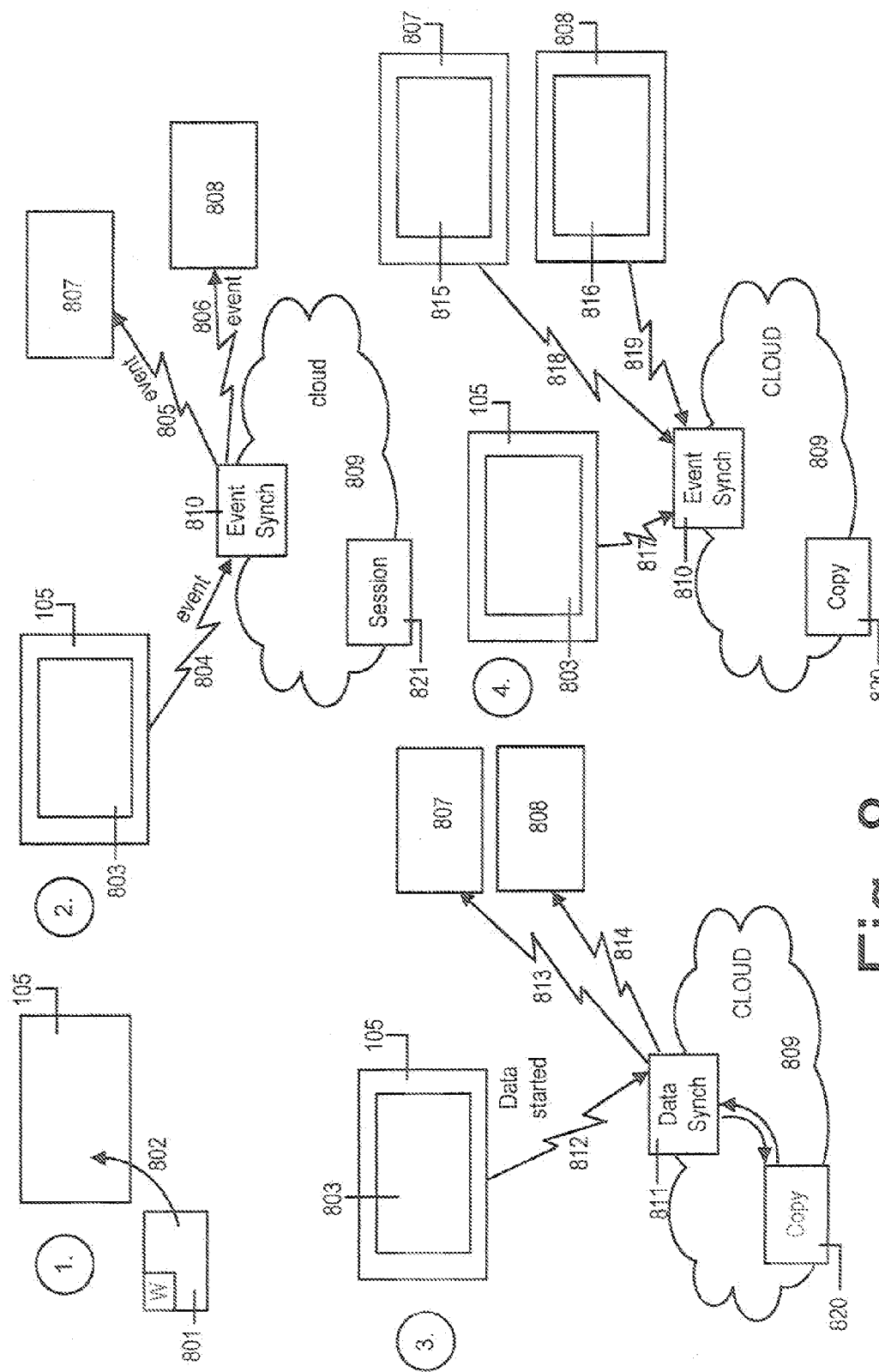
FIG. 8 is a block diagram of a routine that enables single-action drag-in sharing of data and automatic storing the shared data in a distributed computing system, according to one embodiment.

Synchronization layer (717) consists of the four components that enable the synchronization of the several user interfaces working around the same data objects or the same application. The four components are as follow:

- 718 Time Synchronization—Crucial for all parts of the process. It is very precise, synchronizing every five seconds
- 719 Data Object Synchronization—Working in conjunction with Data Stream Synchronization (see below), ensures that the data objects that are being manipulated are being synchronous and that multiple participants.
- 720 Data Stream Synchronization—Working in conjunction with Data Object Synchronization (see above), ensures that the data objects that are being manipulated are being synchronous and that multiple participants.
- 721 State Synchronization—the synchronization of the UI FIG. 8 is a block and flow diagram of single-action drag-in sharing of data and automatic storing of the shared data in a distributed computing system, according to one embodiment.

Step 1: A user is engaged in a data-sharing and data-manipulation session with aim to share Word document data object (801). User initiates sharing of a data object by dragging it (802) into the shared space (105). A viewer for the appropriate data object is activated, in this case a viewer for Word documents.

Step 2: The moment it is activated, an event system of the client computer of a user participating in the data sharing and manipulation session sends an event to the event synchronization server that the new data object is being shared. The event synchronization server requests the list of session participants from the session component in the distributed computing system and the session component discovers that two participants are working with the user in collaborative session 105. The events 805-806 that the data is being shared with them are sent to the participants of the sharing session by event synchronization server. Upon receiving events 805-806 clients start displaying animation to notify the users that synchronization is starting.

Step 3: The data synchronization components on the clients start exchanging messages and event between each other and the data synchronization server according to data synchronization protocol. The data object itself is split into chunks and are synchronized chunk by chunk. Immediately, without waiting for the entire file to be uploaded into the distributed computing system, the parts of the file or data object that arrive in the distributed computing system are synchronized with the data synchronization component to participants 807-808, shown by path 813-814.

At the same time, all the copies of these bits of data are stored in the distributed computing system's storage area. A local copy of the data (820) is stored seamlessly and transparently at the event of sharing. De-duplication system is in place which makes sure no two copies of identical files are stored in the storage system.

Step 4: When all the bits of data that have been transferred to the participants of the data sharing session, the participants tell the event synchronization server that the synchronization has been completed. Upon receiving all of these events the server sends out confirmation events and the clients make the data object available for manipulation, sharing and collaboration for the users.

Figure 9:
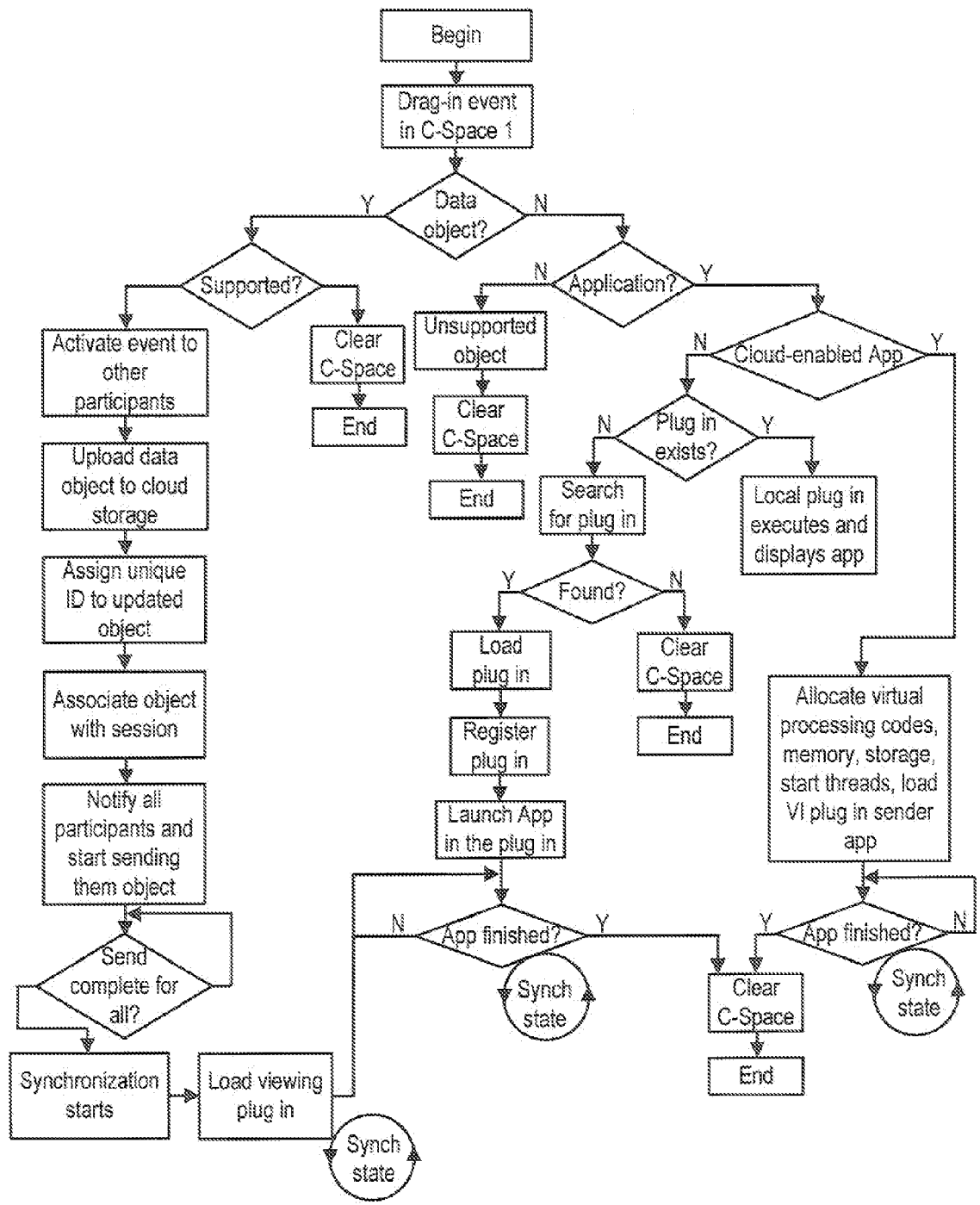
FIG. 9 is a flow diagram that represents single-action drag-in sharing of data objects and applications, according to one embodiment.

FIG. 9 is a flow diagram of single-action drag-in sharing of data objects and applications, according to one embodiment.

Figure 10:
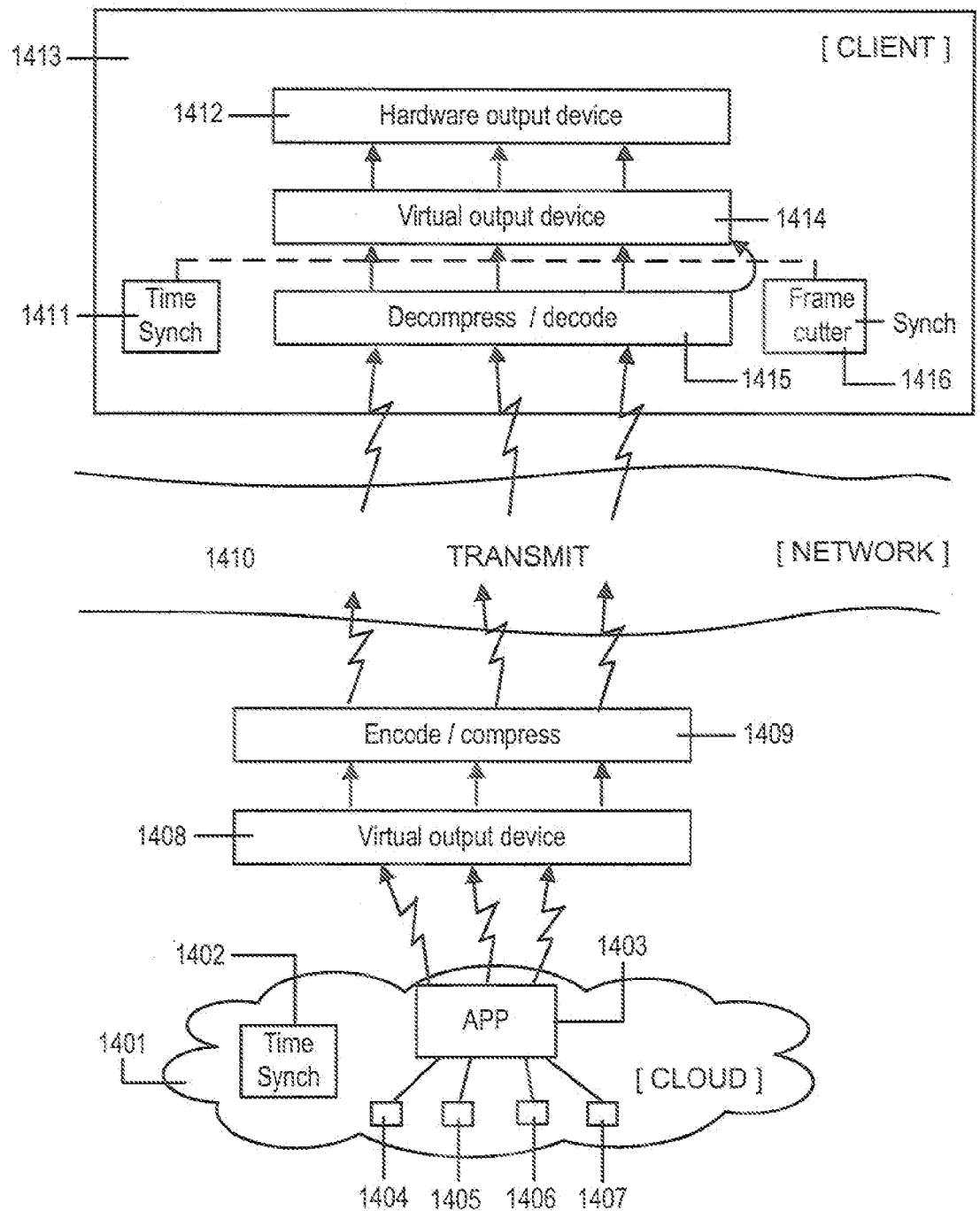
FIG. 10 is a flow diagram of a routine that enables synchronous manipulation of data in a communication/collaboration session around application which is running in a distributed computing system, according to one embodiment.

FIG. 10 is a block diagram synchronization and synchronous manipulation of the data among multiple participants in a data manipulation session based on an application working in a distributed computing system, according to one embodiment.

A distributed computing system (1401) has all of the computing units (1404-1407,) and timed synchronization component, timed synchronization server (1402) and has an application running in a distributed computing system (1403.) This application has been launched and is actually working for the user interface for data manipulation and data sharing, which was initiated by the client. This application is working through the cloud.

The application working in a distributed computing system is receiving its input (like mouse movement or keyboard strokes) from a virtual input layer which in fact receives those commands from the C-Space User interface over the network. The application outputs graphics to a virtual graphic device. That output, which represents a set of commands such as triangles or low-level graphic primitives, is captured by the system and encoded and compressed to minimize traffic. It is transmitted over network to client, where it is decompressed, decoded and put to the virtual output device.

Before that, timestamp of the frames of the graphic output are compared. The time is always synchronized among all of the participants of the collaboration session. The synchronization is tight, resulting in each session participant's viewing and/or hearing the same thing. It is synchronized by an algorithm, which is referenced in our previous patent.

Consider a frame of graphics data to be displayed on a client computer being received in the moment of time "T" and let's assume that the frame is time-stamped "T Prime". If T Prime is less than T by significant amount ($>T_{threshold}$, which varies by application according to its latency requirements) the frame is discarded. Whichever user has the fastest computer receives the best picture, the best output. A user with a slower computer or connection experiences skipped frames in order to keep them at the same level of synchronization, at the same frame of the graphical output.

This graphical output is decompressed, decoded. A frame can be cut or dropped if it is out of time, but it can also remain there. Everything else goes to the virtual output device, which actually redirects the output to the hardware output device, which can be the screen of a mobile phone, a plasma TV connected to a home entertainment center, or a laptop display.

Figure 11:
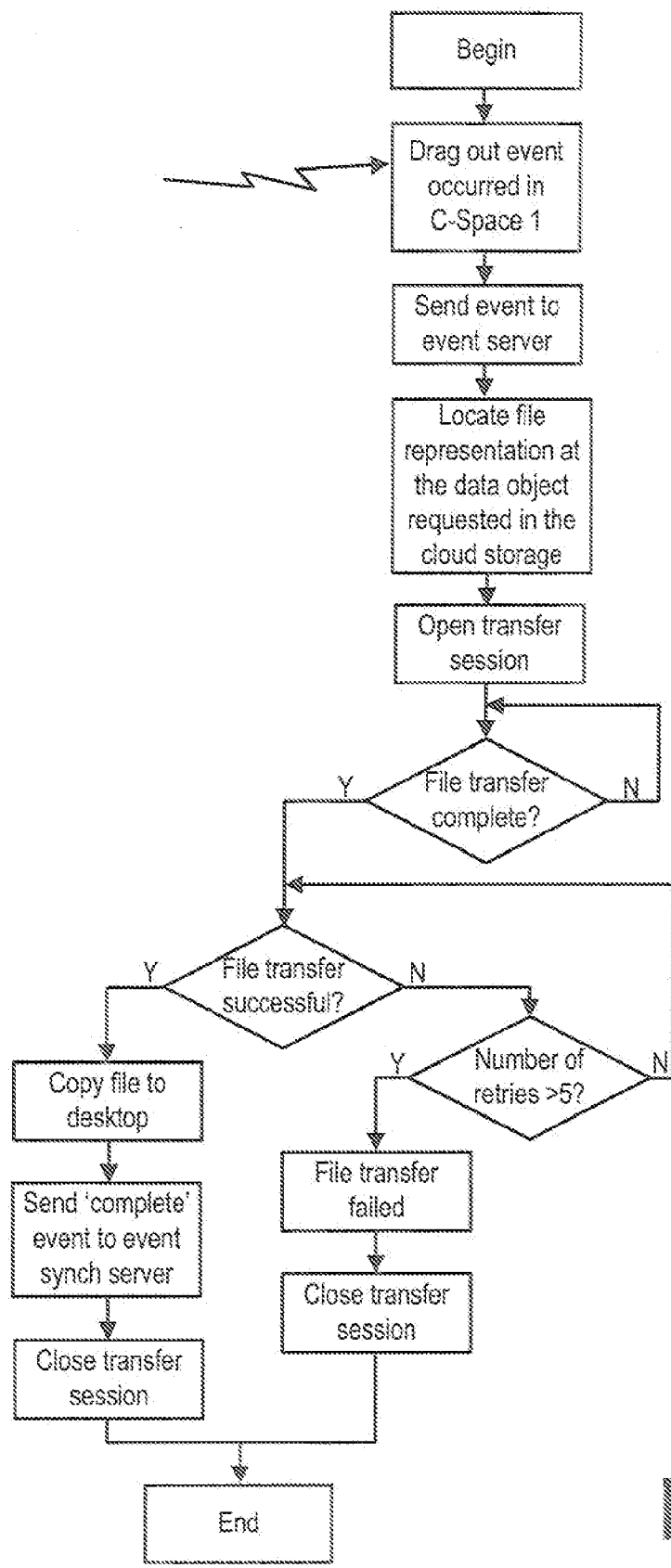
FIG. 11 is a flow diagram of a routine that enables single-action drag-out interface for storing shared data on a local computer, according to one embodiment.

FIG. 11 is a flow diagram of single-action drag-out interface for storing shared data on a local computer, according to one embodiment.

Figure 12:
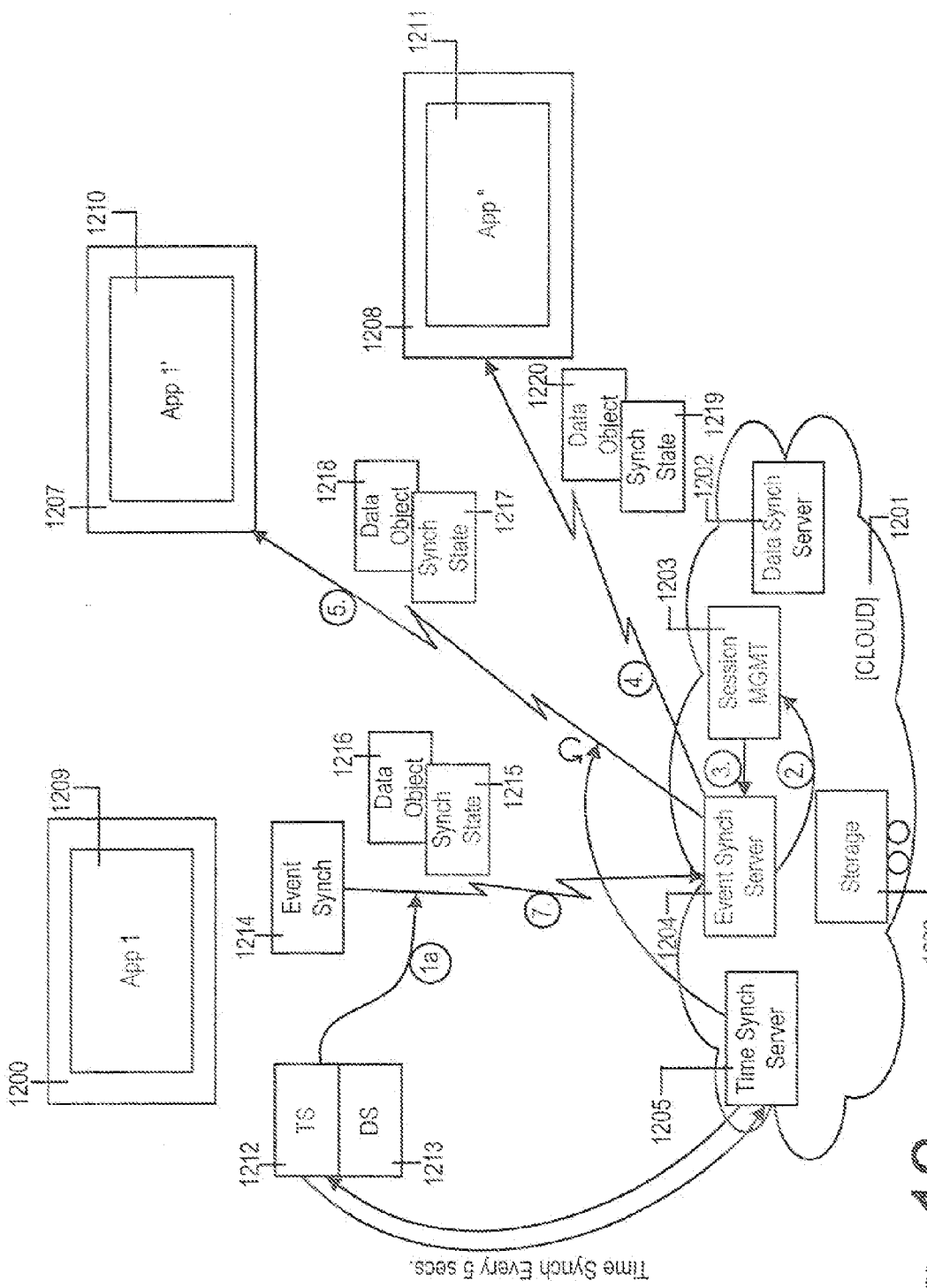
FIG. 12 is a flow diagram of a routine that enables synchronization of the C-Space distributed computing interface and of the state of data objects during a data sharing session, according to one embodiment.

FIG. 12: is a flow diagram of synchronization of the C-Space distributed computing interface and of the state of data objects during a data sharing session, according to one embodiment.

Users A, B, C are participating in a data sharing and manipulation session by using C-Space interface. They have shared spaces 106, 107, 108 open respectively. All the C-Space clients in the session in question are running the same application App1. Different instances of the applications are represented as App1, App1' and App1" running inside application viewer plug-ins 1209, 1210, 1211.

Distributed computing system 1201 is running the following components used in this client synching session, according to one embodiment:
  Data Synchronization Server 1202
  Session Management Server Component 1203
  Event Synchronization Server 1204
  Time Synchronization Server 1205
  Storage subsystem 1206.

Each of C-Space User Interface clients have the following 3 components involved in the synchronization process, according to one embodiment:
  Time Synchronization Client Component 1212
  Data Synchronization Client Component 1213
  Event Synchronization Client Component 1214.

Time synchronization server and time synchronization components implement algorithm and protocol for precise continuous time synchronization among multiple participants in a communication session described in sections 0041-0076 of the previously filed patent application #2008/0181260 A1 "Method and system for precise synchronization of audio and video streams during a distributed communication session with multiple participants". The implementation of these methods introduces a common time system which is synchronized to the order of milliseconds or tens of milliseconds.

The synchronization occurs by exchanging time stamped events encoded in messages which also carry payload data between clients and distributed computing system. A sample seven-step sequence of exchange is illustrated in the figure and described below.

Step 1. An event that needs to be synchronized (e.g. a mouse click or a drag in of a data object into C-Space session) is generated by Event Synchronization Client Component 1214. It contains a timestamp provided by Time Synchronization Client Component 1212 on Step 1a, synchronization state (all variables, etc.) and payload data object supplied by Data Synchronization Client Component 1213 (i.e. a chunk of a file that is being synchronized).

Step 2. Event Synchronization Server 1204 places a request to Session Management Server Component 1203 to get all the participants of the data sharing and manipulation session unless it has the list cached in its memory stack.

Step 3: Session Management Component returns the addresses of the users and request Time Synchronization Server to put a timestamp on the event.

Step 4. Notification events time stamped by Time Synchronization server 1205 are sent out to clients and are processed by their event synchronization components.

Step 5: Payload data objects are sent as separate messages with timestamps and synchronization state associated with the initial event that was generated.

Step 6: Event synchronization Client Component on the cloud discards event and modifications that originated by time T earlier before the actual arrival because that data may become irrelevant. Constant T varies per application. All events that arrive within a given timeframe un-discarded, state and payload data are applied and "mixed".

Step 7: The modified state content and payload data is sent back to the event and data synchronization servers with their timestamp and the process completes the loop of perpetual synchronization.

Synchronization of live data, audio and video streams during a data manipulation session can be accomplished through any suitable mechanism. One example technique is described in U.S. Published Patent Application No. 2008/0181260 A1 entitled "Method and system for precise synchronization of audio and video streams during a distributed communication session with multiple participants," the contents of which are incorporated herein by reference.

A method and system for distributed computing interface are disclosed. It is understood that the embodiments described herein are for the purpose of elucidation and should not be considered limiting the subject matter of the present embodiments. Various modifications, uses, substitutions, recombinations, improvements, methods of productions without departing from the scope or spirit of the present invention would be evident to a person skilled in the art.

We claim:

1. A computer-implemented method, the method comprising:
  accessing a collaborative interface coupled to a distributed computing system, wherein the collaborative interface spanning across multiple users' devices is generated by using cloud computing: wherein at least two of the multiple users' devices are coupled via Internet; wherein the collaborative interface comprises persistent shared space, and wherein a visual representation of the collaborative interface is identical for each client accessing the collaborative interface; wherein the collaborative interface includes a virtualization system and a synchronization system; wherein the virtualization system and the synchronization system dynamically respond to data objects received in order to configure the distributed computing communication, and synchronization or shared data relative to a data object type and the data transfer needs of clients sharing the data;
  dragging an object into the collaborative interface in a single action, wherein the object is displayed in real time in the collaborative interface, wherein the object is accessible to other clients in the collaborative interface, wherein the state of the object is continuously synchronized;
  receiving a data object into the collaboration interface;
  detecting, by the collaboration interface, the data object type received;
  determining from the type of data object the extent of distributed computing needed to allow the data object to be shared and manipulated by a plurality of clients connected to the distributed computing system;
  configuring real-time data pipes included with the virtualization system in response to the data object to establish a duplex path of communication between the plurality of clients with respect to the data object being shared;
  configuring asynchronous data pipes included with the virtualization system in response to the data object to establish an asynchronous delivery path for communication between the plurality of clients with respect to the data object being shared; and
  configuring the synchronization system in response to the data object in order to synchronize the data object, the time, and a state of the plurality of clients sharing the data object to within pre-determined synchronization precision;

establishing at least one application instantiated across the distributed computing system, wherein the at least one application is configured to send and receive encoded data through the virtualization system; and sharing the data object amongst the plurality of clients through the collaboration interface, manipulating the object in the collaborative interface; and viewing other clients accessing the collaborative interface; and dragging the object out of the collaborative interface to save a local copy of the object into a client.

2. The method of claim 1, further comprising editing the data object in the collaborative interface.

3. The method of claim 1, further comprising deleting the data object from the collaborative interface.

4. The method of claim 1, further comprising exporting the data object to a client from the collaborative interface.

5. The method of claim 1, wherein the data object is one or more of a media file, a URL, an image, a folder, an application data file, a short-cut to an application, an executable file, and a flash file.

6. The method of claim 1, wherein the data object comprises an application running locally on a client.

7. The method of claim 1, wherein the data object comprises an application running on the distributed computing system.

8. The method of claim 1, wherein the collaborative interface comprises a video chat interface.

9. The method of claim 1, wherein the data object comprises an access control list.

10. A system, comprising:

a collaborative interface coupled to a distributed computing system, wherein the collaborative interface spanning across multiple users' devices is generated by using cloud computing, wherein at least two of the multiple users' devices are coupled via the Internet, wherein the collaborative interface comprises persistent shared space, and wherein a visual representation of the collaborative interface is identical for each client accessing the collaborative interface, wherein the collaborative interface includes a virtualization system and a synchronization system, wherein the virtualization system and the synchronization system dynamically respond to data objects received in order to configure the distributed computing, communication, and synchronization of shared data relative to the data object type and the data transfer needs of client devices sharing the data; and software, stored on a non-transitory medium, executable by the one or more client device comprising computer executable instructions for receiving a data object into the collaboration interface;

detecting, by the collaboration interface, the type of data object received;

determining from the type of data object the extent of distributed computing needed to allow the data object to be shared and manipulated by the one or more client devices connected to the distributed computing system;

configuring real-time data pipes included in the virtualization system in response to the data object to establish a duplex path of communication between the one or more client devices with respect to the data object being shared;

configuring asynchronous data pipes included in the virtualization system in response to the data object to establish an asynchronous delivery path for communication between the one or more client devices with respect to the data object being shared;

configuring the synchronization system in response to the data object in order to synchronize the data object, the time, and a state of the one or more client devices sharing the data object to within a pre-determined synchronization precision;

establishing at least one application instantiated across the distributed computing system;

wherein the at least one application is configured to send and receive encoded data through the virtualization system; and sharing the data object amongst the one or more client devices through the collaboration interface.

11. The system of claim 10, further comprising editing the data object in the collaborative interface.

12. The system of claim 10, further comprising deleting the data object from the collaborative interface.

13. The system of claim 10, further comprising exporting the data object to a client device from the collaborative interface.

14. The system of claim 10, wherein the data object is one or more of a media file, a URL, an image, a folder, an application data file, a short-cut to an application, an executable file, and a flash file.

15. The system of claim 10, wherein the data object comprises an application running locally on a client device.

16. The system of claim 10, wherein the data object comprises an application running on the distributed computing system.

17. The system of claim 10, wherein the collaborative interface comprises a video chat interface.

18. The system of claim 10, wherein the data object comprises an access control list.

19. A computer-implemented method, the method comprising:

accessing a collaborative interface coupled to a distributed computing system, wherein the collaborative interface spanning across multiple users' devices is generated by using cloud computing, wherein at least two of the multiple users' devices are coupled via the Internet, wherein the collaborative interface comprises persistent shared space, and wherein a visual representation of the collaborative interface is identical for each client accessing the collaborative interface, wherein the collaborative interface includes a virtualization system and a synchronization system; wherein the virtualization system and the synchronization system dynamically respond to data objects received in order to configure the distributed computing, communication, and synchronization of shared data relative to the data object type and the data transfer needs of clients sharing the data;

receiving a data object into the collaboration interface;

detecting, by the collaboration interface, the data object type received;

determining, from the type of data object, the extent of the distributed computing needed to allow the data object to be shared and manipulated by a plurality of clients connected to the distributed computing system;

configuring real-time data pipes included in the virtualization system in response to the data object to establish a duplex path of communication between the plurality of clients with respect to the data object being shared;

configuring asynchronous data pipes included in the virtualization system in response to the data object to establish an asynchronous delivery path for communication between the plurality of clients with respect to the data object being shared;

configuring the synchronization system in response to the data object in order to synchronize the data object, the time, and a state of the plurality of clients sharing the data object to within a pre-determined synchronization precision;

uploading data chunks of the data object to the synchronization system;

distributing the data chunks to other clients, by the synchronization system, without waiting for all data chunks of the data object to be uploaded to the synchronization system; and displaying the data object substantially in real time in the collaborative interface.

20. The method of claim 19, further comprising storing a copy of the data object in the synchronization system.

21. The method of claim 19, wherein in the step of displaying the data object, the data object is being displayed substantially in real time in the collaborative interface after all data chunks of the data object are distributed to one or more of the other clients.

22. The method of claim 19, wherein in the step of manipulating the data object, the data object is being manipulated in the collaborative interface by at least one of the clients in synchronized real time.

23. The method of claim 19, wherein in the step of displaying the data object, frame timestamps of graphic outputs of the clients are compared.

24. The method of claim 19, wherein in the step of displaying the data object, display time of the data object is synchronized among all the clients accessing the collaborative interface.

25. A computer-implemented method for sharing data objects across a distributed computing system, the method comprising:

receiving a data object via a virtual input portion of a virtualization system connected to and having at least a portion thereof instantiated within a distributed computing system, the virtual input portion configured to encode instructions received from two or more client devices manipulating the data object through a real-time data pipe and an asynchronous data pipe;

receiving the data object by a shared collaboration space portion of the virtualization system; wherein the shared collaboration space is configured to be responsive to the data objects received;

determining, by the virtualization system, a type of the data object received;

reconfiguring at least a portion of the distributed computing system in response to the type of the data object received;

in response to the data object type, launching an application configured to process the data object, wherein at least a portion of the application is instantiated across the distributed computing system;

encoding and compressing the data object and data associated therewith in a form for use with the application;

providing a virtual output portion of the virtualization system configured to decode a display view of the data object received from the application for viewing by two or more clients coupled to the virtualization system via the distributed computing system via the real-time data pipe and the asynchronous data pipe; and synchronizing the data object views and data object manipulations amongst the two or more clients via a synchronization system connected to and having at least a portion thereof instantiated across the distributed computing system, wherein the synchronization is configured to process virtual inputs and virtual outputs of the virtualization system through the real-time data pipe and the asynchronous data pipe to near real-time precision with respect to the data object and a predetermined synchronization threshold.

26. The method of claim 25, wherein receiving the data object further comprises initiating a configuration of the distributed computing system in response to the data object received via a motion by the data object being moved into the virtual input portion.

27. The method of claim 25, further comprising:

receiving payload data objects representing modifications to the data object by the two or more client devices manipulating the data object;

determining timestamps and synchronization states for the payload data objects received;

maintaining a first set of the payload data objects that have timestamps within a predetermined timeframe;

discarding a second set of the payload data objects that have timestamps outside a predetermined timeframe;

combining the modifications and the synchronization states received from the first set of payload data objects received to form a mixed set of modifications and the synchronization states; and applying the mixed set of modifications and the synchronization states to the data object views in order to maintain a synchronous presentation of the data object to the two or more client devices.

\* \* \* \* \*